(12) United States Patent
Nagata

(10) Patent No.: US 8,014,072 B2
(45) Date of Patent: Sep. 6, 2011

(54) ERECTING EQUAL-MAGNIFICATION LENS ARRAY PLATE, IMAGE SENSOR UNIT, AND IMAGE READING DEVICE

(75) Inventor: Hideshi Nagata, Minato-ku (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 273 days.

(21) Appl. No.: 12/193,994

(22) Filed: Aug. 19, 2008

(65) Prior Publication Data
US 2009/0052044 A1     Feb. 26, 2009

(30) Foreign Application Priority Data

Aug. 20, 2007  (JP) ................................ 2007-213772
Mar. 10, 2008  (JP) ................................ 2008-059692

(51) Int. Cl.
*G02B 27/10* (2006.01)
(52) U.S. Cl. ..................................................... 359/621
(58) Field of Classification Search .................. 359/621, 359/622, 623, 626
See application file for complete search history.

(56) References Cited

U.S. PATENT DOCUMENTS

| | | | | |
|---|---|---|---|---|
| 4,553,036 | A | * | 11/1985 | Kawamura et al. ......... 250/208.1 |
| 5,822,125 | A | * | 10/1998 | Meyers .......................... 359/621 |
| 6,707,613 | B2 | * | 3/2004 | Fujimoto et al. .............. 359/622 |

FOREIGN PATENT DOCUMENTS

| | | |
|---|---|---|
| JP | 2005-037891 A | 2/2005 |
| JP | 2005-122041 A | 5/2005 |

* cited by examiner

*Primary Examiner* — Scott J Sugarman
*Assistant Examiner* — Vipin M Patel
(74) *Attorney, Agent, or Firm* — Sughrue Mion, PLLC

(57) ABSTRACT

An erecting equal-magnification lens array plate includes a stack of a plurality lens array plates built such that pairs of corresponding lenses form a coaxial lens system, where each lens array plate is formed with a plurality of convex lenses on both surfaces of the plate. The plate receives light from a substantially straight light source facing one side of the plate, and the plate forms an erect equal-magnification image of the substantially straight light source on an image plane facing the other side of the plate. A light shielding member operative to shield light not contributing to imaging is formed in the neighborhood of a position in the intermediate plane in the erecting equal-magnification lens array plate where an inverted image of the substantially straight light source is formed. The main lens arrangement direction of the convex lenses differs from the main scanning direction of the erecting equal-magnification lens array plate.

11 Claims, 17 Drawing Sheets

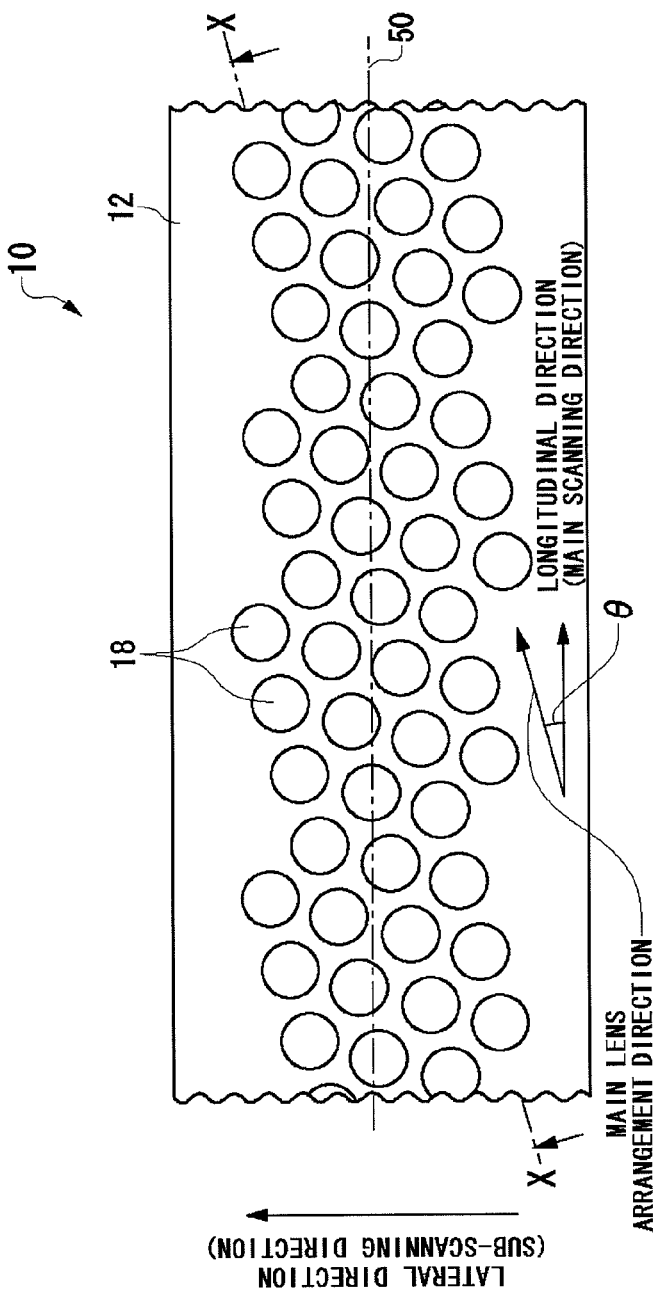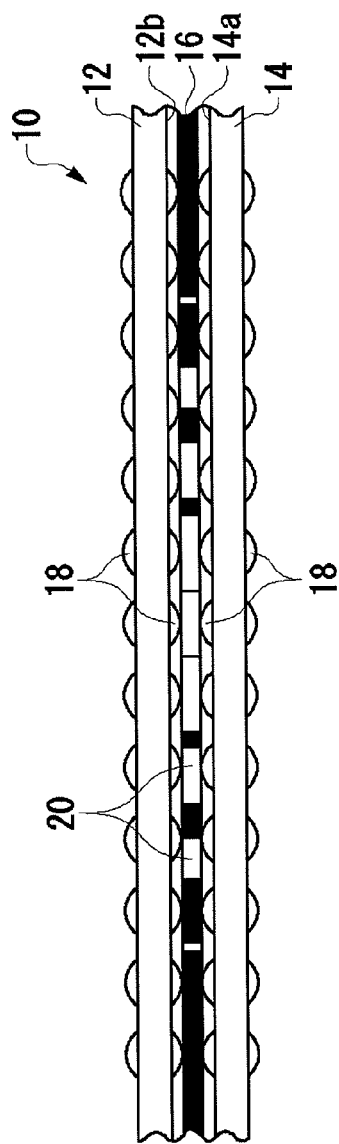
FIG.2A
FIG.2B

SUB-SCANNING DIRECTION

ERECTING EQUAL-MAGNIFICATION LENS ARRAY PLATE, IMAGE SENSOR UNIT, AND IMAGE READING DEVICE

BACKGROUND OF THE INVENTION

1. Field of the Invention

The present invention relates to erecting equal-magnification lens array plates used in image reading devices and image forming devices and to image sensor units and image reading devices using the erecting equal-magnification lens array plate.

2. Description of the Related Art

Some image reading devices such as scanners and image forming devices such as LED printers are known to use erecting equal-magnification optics. Erecting equal-magnification optics are capable of reducing the size of devices better than reduction optics. In the case of image reading devices, an erecting equal-magnification optical system comprises a line light source, an erecting equal-magnification lens array, and a line image sensor. In the case of image forming devices, an erecting equal-magnification optical system comprises a line light source, an erecting equal-magnification lens array, and a photosensitive drum.

A rod lens array capable of forming an erect equal-magnification image is used as an erecting equal-magnification lens array in an erecting equal-magnification optical system. Normally, a rod lens array comprises an array of rod lenses in the longitudinal direction (main scanning direction of the image reading device) of the lens array. By increasing the number of columns of rod lenses, the proportion of light transmitted is improved and unevenness in the amount of light transmitted is reduced. Due to price concerns, it is common to use one or two columns of rod lenses in a rod lens array.

Meanwhile, an erecting equal-magnification lens array plate could be formed as a stack of a plurality of transparent lens array plates built such that the optical axes of individual convex lenses are aligned, where each transparent lens array plate includes a systematic arrangement of micro-convex lenses on one or both surfaces of the plate. Since an erecting equal-magnification lens array plate such as this can be formed by, for example, injection molding, erecting equal-magnification lens arrays in a plurality of columns can be manufactured at a relatively low cost.

An erecting equal-magnification lens array plate lacks a wall for beam separation between adjacent lenses. Therefore, there is a problem of stray light wherein a light beam diagonally incident on an erecting equal-magnification lens array plate travels diagonally inside the plate and enters an adjacent convex lens, creating a ghost image as it leaves the plate.

Patent document No. 1 discloses a technology to address stray light whereby a light shielding wall is provided on the surface of an erecting equal-magnification lens array plate and a partition having a slit opening is provided around the erecting equal-magnification lens array plate. Patent document No. 2 discloses an imaging optical system provided with a light shielding means on an intermediate imaging surface of an erecting equal-magnification lens array plate.

[patent document No. 1] JP 2005-37891
[patent document No. 2] JP 2005-122041

In the case of the imaging optical system disclosed in patent document No. 1, however, it is difficult to reduce the size and weight of the optical system due to the partition having a slit opening and provided around the erecting equal-magnification lens array plate.

In the case of an imaging optical system disclosed in patent document No. 2, stray light in the sub-scanning direction (lateral direction of the erecting equal-magnification lens array plate) can be eliminated by the light shielding means. Our study revealed, however, that it is difficult to eliminate stray light in the main scanning direction.

SUMMARY OF THE INVENTION

In this background, a general purpose of the present invention is to provide an erecting equal-magnification lens array plate capable of eliminating stray light suitably and allowing reduction of the size and weight of an optical system, and an image sensor unit and an image reading device using the inventive erecting equal-magnification lens array plate.

An erecting equal-magnification lens array plate addressing the purpose includes a stack of a plurality lens array plates built such that pairs of corresponding lenses form a coaxial lens system, where each lens array plate is formed with a plurality of lenses on one or both surfaces of the plate, the plate receiving light from a substantially straight light source facing one side of the plate, and the plate forming an erect equal-magnification image of the substantially straight light source on an image plane facing the other side of the plate, wherein a light shielder operative to shield light not contributing to imaging is formed in the neighborhood of a position in the intermediate plane in the erecting equal-magnification lens array plate where an inverted image of the substantially straight light source is formed, and the main lens arrangement direction differs from the main scanning direction of the erecting equal-magnification lens array plate.

By providing a light shielder in the neighborhood of a position in the intermediate plane in the erecting equal-magnification lens array plate where an inverted image of the substantially straight light source is formed, and by ensuring that the main lens arrangement direction differs from the main scanning direction, stray light is suitably eliminated and a ghost-free erect equal-magnification image is formed on the imaging plane. Since a light shielder is provided in the intermediate plane in the erecting equal-magnification lens array plate, the size and weight of the imaging optical system is reduced more successfully than when a partition is provided around the erecting equal-magnification lens array plate.

The light shielder may restrict a light transmitting region of each lens such that lens regions outside a slit opening, which is substantially parallel with the main scanning direction, are totally prevented from transmitting light.

The light shielder may ensure that each lens transmits light in a region in which an effective region of the lens overlaps the slit opening having a regular width parallel with the main scanning direction and that light is totally prevented from being transmitted in the other regions.

The shielder may define an opening located inside the slit opening and smaller than the slit opening, by using a curve or a straight line such that transmission of light through the portions other than the opening thus defined is prevented.

Given that the lens array plate has a plate thickness t, the lens's working distance is denoted by WD, and the lens array plate has a refractive index n, and a distance between the center of the lens and a reference plane perpendicular to the erecting equal-magnification lens array plate and parallel with the main scanning direction is denoted by y1, a distance Y between the reference plane and the center of the slit opening in the sub-scanning direction may be given by $$Y = y1 \times \{1 + t/(WD \times n)\}$$

Given that the lens array plate has a plate thickness t, the lens's working distance is denoted by WD, the lens array plate has a refractive index n, the lens pitch is denoted by P, and a lens arrangement angle is denoted by θ, a width w of the slit opening in the sub-scanning direction may be in the range given by $$w < 2 \times \{1 + t/(WD \times n)\} \times P \times \sin\theta.$$

Given that a width of the erect equal-magnification image required on the image plane is denoted by w0, a width w of the slit opening in the sub-scanning direction may be in the range given by $$w \leq 2 \times \{1 + t/(WD \times n)\} \times P \times \sin\theta - w0 \times t/(WD \times n).$$

Given that a width of the erect equal-magnification image required on the image plane is denoted by w0, a width w of the slit opening in the sub-scanning direction may be in the range given by $$w0 \times t/(WD \times n) \leq w \leq 2 \times \{1 + t/(WD \times n)\} \times P \times \sin\theta - wo \times t/(WD \times n).$$

Given that the lens array plate has a plate thickness t, the lens's working distance is denoted by WD, and the lens array plate has a refractive index n, a width of the slit opening in the sub-scanning direction is denoted by w, and the lens pitch is denoted by P, a lens arrangement angle θ may be set to be larger than θ1 that fulfills a condition $$w = 2 \times \{1 + t/(WD \times n)\} \times P \times \sin\theta 1$$

and smaller than an angle θ2 obtained by subtracting θ1 from a first lens abutting angle determined by the arrangement pattern of the lenses.

The lens arrangement angle θ may be no smaller than the angle θ1 plus 1° and no larger than the angle θ2 minus 1°.

A light shielding wall for further reducing stray light not contributing to imaging may be formed at least on one surface of the erecting equal-magnification lens array plate.

Another aspect of the present invention relates to an image sensor unit. An image sensor unit comprises: a line light source operative to illuminate an image to be read; the aforementioned erecting equal-magnification lens array plate operative to condense light reflected by the image to be read; a light-receiving device for receiving light transmitted by the erecting equal-magnification lens array plate; and a housing in which the line light source, the erecting equal-magnification lens array plate, and the light-receiving device are installed. The erecting equal-magnification lens array plate and the light-receiving device are installed at predetermined positions in the housing by pressing them against an installation reference plane provided in the housing, and given that the lens array plate has a plate thickness t, the lens's working distance is denoted by WD, and the lens array plate has a refractive index n, the lens pitch is denoted by P, a lens arrangement angle is denoted by θ, and a width of the erect equal-magnification image in the sub-scanning direction required on the image plane is denoted by wt0, allowing for an installation tolerance in the sub-scanning direction allowed when installing erecting equal-magnification lens array plate and the light-receiving device are installed in the housing, a width w of the slit opening in the sub-scanning direction is in the range given by $$wt0 \times t/(WD \times n) \leq w \leq 2 \times \{1 + t/(WD \times n)\} \times P \times \sin\theta - wt0 \times t/(WD \times n).$$

Since the aforementioned erecting equal-magnification lens array plate is used to form the image sensor unit, a quality image signal in which stray light is suitably eliminated is obtained, and the size and weight of the image sensor unit is reduced. Since the erecting equal-magnification lens array plate and the light-receiving device are installed by pressing them against the installation reference plane in the housing, the image sensor unit can be built with ease and the manufacturing cost is reduced.

Another aspect of the present invention also relates to an image sensor unit. An image sensor unit comprises: a line light source operative to illuminate an image to be read; the aforementioned erecting equal-magnification lens array plate operative to condense light reflected by the image to be read; a light-receiving device for receiving light transmitted by the erecting equal-magnification lens array plate; and a housing in which the line light source, the erecting equal-magnification lens array plate, and the light-receiving device are installed. The erecting equal-magnification lens array plate is installed at a predetermined position in the housing by pressing the plate against an installation reference plane provided in the housing, the light-receiving device is installed at a predetermined position in the housing by means of an installation reference pin provided in the housing. Given that the lens array plate has a plate thickness t, the lens's working distance is denoted by WD, and the lens array plate has a refractive index n, the lens pitch is denoted by P, a lens arrangement angle is denoted by θ, and a width of the erect equal-magnification image in the sub-scanning direction required on the image plane is denoted by wt0, allowing for an installation tolerance in the sub-scanning direction allowed when installing erecting equal-magnification lens array plate and the light-receiving device are installed in the housing, a width w of the slit opening in the sub-scanning direction is in the range given by $$wt0 \times t/(WD \times n) \leq w \leq 2 \times \{1 + t/(WD \times n)\} \times P \times \sin\theta - wt0 \times t/(WD \times n).$$

Since the aforementioned erecting equal-magnification lens array plate is used to form the image sensor unit, a quality image signal in which stray light is suitably eliminated is obtained, and the size and weight of the image sensor unit is reduced. Since the erecting equal-magnification lens array plate is installed by pressing it against the installation reference plane in the housing and the light-receiving device is installed in the housing using the installation reference pin, the image sensor unit can be built with ease and the manufacturing cost is reduced.

The housing may be an integrally molded one-piece component. By forming the housing as an integrally molded one-piece component, larger tolerance is allowed in installing the erecting equal-magnification lens array plate and light-receiving devices. As a result, the image sensor unit can be built with ease and the manufacturing cost is reduced.

Another aspect of the present invention relates to an image reading device. An image reading device comprises: the aforementioned image sensor unit; and an image processing unit operative to process an image signal detected by the image sensor unit.

Since the aforementioned image sensor unit is used to form the image reading device, a quality image data in which stray light is suitably eliminated is obtained, and the size and weight of the image reading device is reduced. Since an image sensor that can be assembled using non-alignment, the manufacturing cost of the image reading device is reduced.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 2A and 2B show the erecting equal-magnification lens array plate according to the embodiment;

DETAILED DESCRIPTION OF THE INVENTION

The invention will now be described by reference to the preferred embodiments. This does not intend to limit the scope of the present invention, but to exemplify the invention.

Figure 1:
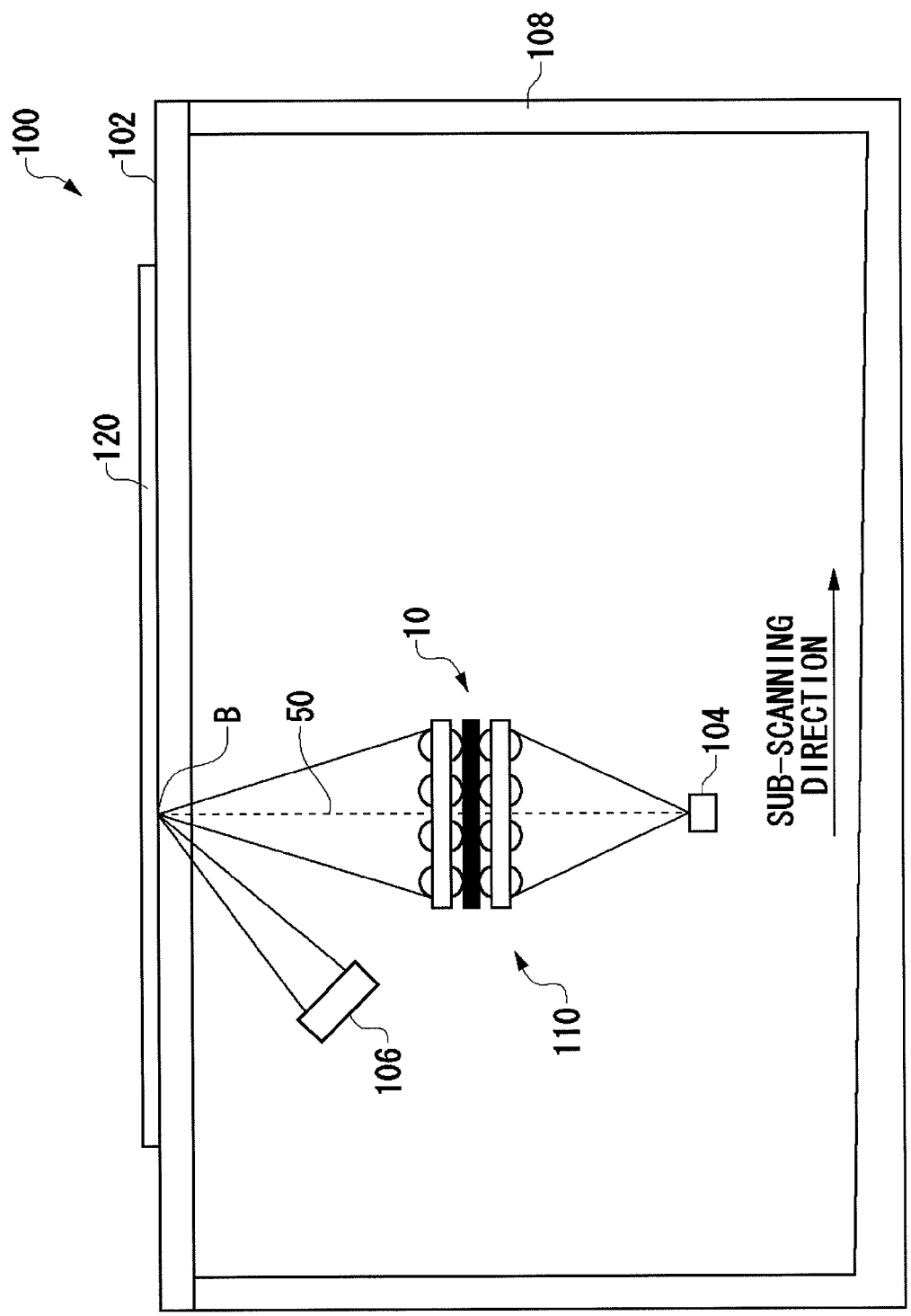
FIG. 1 shows the schematic structure of an image reading device using an erecting equal-magnification lens array plate according to an embodiment of the present invention.

FIG. 1 shows the schematic structure of an image reading device 100 using an erecting equal-magnification lens array plate 10 according to an embodiment of the present invention. An erecting equal-magnification imaging optical system 110 (also referred to as an image sensor unit) is housed inside a housing 108 of the image reading device 100. The erecting equal-magnification imaging optical system 110 is provided with a line light source 106, an erecting equal-magnification lens array plate 10, and a line image sensor 104.

The line light source 106 is a light source emitting a substantially straight light. The term "substantially straight" encompasses straight lines having a width of about 200 μm, or curves or staggered lines not exceeding a width of about 200 μm. The light exiting the line light source 106 is projected onto a document 120 (image to be read) placed on a document table 102. The document 120 reflects the substantially straight light from the line light source 106 toward the erecting equal-magnification lens array plate 10. The light-reflecting region of the document 120 will be referred to as a light source B as the case demands. The light source B emits substantially straight light toward the erecting equal-magnification lens array plate 10.

The erecting equal-magnification lens array plate 10 comprises a stack of a plurality of transparent lens array plates built such that pairs of corresponding lenses form a coaxial lens system, where each lens array plate is formed with a plurality of lenses on one or both surfaces of the plate. The erecting equal-magnification lens array plate 10 receives substantially straight light from the light source B facing one side of the plate and forms an erect equal-magnification image on an image plane facing the other side of the plate. The line image sensor 104 as a light-receiving device is provided on an image plane on which the erect equal-magnification image is formed, so as to receive the erect equal-magnification image. By running the erecting equal-magnification imaging optical system 110 in the sub-scanning direction, the document 120 is scanned.

The erecting equal-magnification lens array plate 10 is installed in the image reading device 100 such that the longitudinal direction thereof is aligned with the main scanning direction and the lateral direction thereof is aligned with the sub-scanning direction. The erecting equal-magnification lens array plate 10 is installed the image reading device 100 such that the central line of the light source B and that of the line image sensor 104 are located on a reference plane 50, wherein the reference plane 50 is defined as a plane perpendicular to the erecting equal-magnification lens array plate 10 and passing through the central line of the erecting equal-magnification lens array plate 10 in the sub-scanning direction.

FIGS. 2A and 2B show the erecting equal-magnification lens array plate 10 according to the embodiment. FIG. 2A is a top view of the erecting equal-magnification lens array plate 10, and FIG. 2B is a X-X section of the erecting equal-magnification lens array plate 10 shown in FIG. 2A.

As shown in FIGS. 2A and 2B, the erecting equal-magnification lens array plate 10 is provided with a first lens array plate 12, a second lens array plate 14, and a light shielding member 16. Each of the first lens array plate 12 and the second lens array plate 14 is rectangular in shape and is provided with an arrangement of a plurality of convex lenses 18 on both sides thereof.

Preferably, each of the first lens array plate 12 and the second lens array plate 14 is formed of a material amenable to injection molding, having high light transmittance in a desired wavelength range, and having low water absorption. Desired materials include cycloolefin resins, olefin resins, and norbornene resins.

The convex lenses 18 are in the same arrangement pattern in the first lens array plate 12 and in the second lens array plate 14 such that the lenses face each other when the first lens array plate 12 and the second lens array plate 14 are placed opposite to each other. The first lens array plate 12 and the second lens array plate 14 are placed such that the optical axes of corresponding convex lenses 18 are aligned. In this embodiment, it is assumed that the convex lenses 18 are spherical in shape. Alternatively, the convex lenses 18 may have non-spherical shapes.

As shown in FIG. 2A, the convex lenses 18 are arranged in a hexagonal arrangement. A hexagonal arrangement extends in six directions as viewed from a given convex lens 18. Moreover, the convex lenses 18 are arranged in the erecting equal-magnification lens array plate 10 according to this embodiment such that the main direction of the arrangement of lenses is different from the longitudinal direction (main scanning direction) of the erecting equal-magnification lens array plate 10. In this embodiment, the direction of a line connecting the centers of two adjacent lenses will be referred to as a proximal lens arrangement direction. The phrase "adjacent lenses" denotes two lenses with no other lenses interposed therebetween. Of the proximal lens arrangement directions, the direction in which the maximum number of lenses occur in a arrangement will be referred to as a main lens arrangement direction. Of the angles formed by the main lens arrangement direction and the main scanning direction, the smaller will be referred to as a lens arrangement angle θ.

In the case of forming an image of a point light source on an image plane using an erecting equal-magnification lens array plate in which lens array plates are placed opposite to each other, stray light occur in the proximal lens arrangement direction. Therefore, if the main lens arrangement direction matches the main scanning direction, as disclosed in JP 2005-122041, stray light will directly enter the line image sensor provided parallel with the main scanning direction, generating a ghost image. The phenomenon occurs irrespective of whether a lens is located on the reference plane or away from the reference plane. A ghost image is generated so long as the lenses (light transmitting portions thereof) are arranged parallel to the main scanning direction. The erecting equal-magnification lens array plate 10 according to this embodiment can reduce stray light directly entering the line image sensor because the direction in which stray light occurs is shifted in the sub-scanning direction as a result of ensuring that the main lens arrangement direction is different from the main scanning direction.

The light shielding member 16 is a film member provided between the first lens array plate 12 and the second lens array plate 14. As shown in FIG. 2B, the light shielding member 16 is sandwiched by the convex lens 18 formed on the bottom surface 12b of the first lens array plate 12 and the convex lens 18 formed on the top surface 14b of the second lens array plate 14.

The light shielding member 16 functions as a light shielding means for shielding light not contributing to imaging. As described, the erecting equal-magnification lens array plate 10 is configured such that the main lens arrangement direction differs from the main scanning direction. This can only ensure that the direction in which stray light occurs is shifted in the sub-scanning direction and does not eliminate stray light itself. In this regard, the erecting equal-magnification lens array plate 10 according to this embodiment is provided with the light shielding member 16 so as to prevent stray light shifted in the sub-scanning direction from being transmitted by the erecting equal-magnification lens array plate 10. Even if stray light does not directly enter the line image sensor, illumination of the neighborhood of the line image sensor by stray light results in lower contrast and drop in image quality. By providing the light shielding member 16, stray light is suitably eliminated and image quality is improved.

Figure 3:
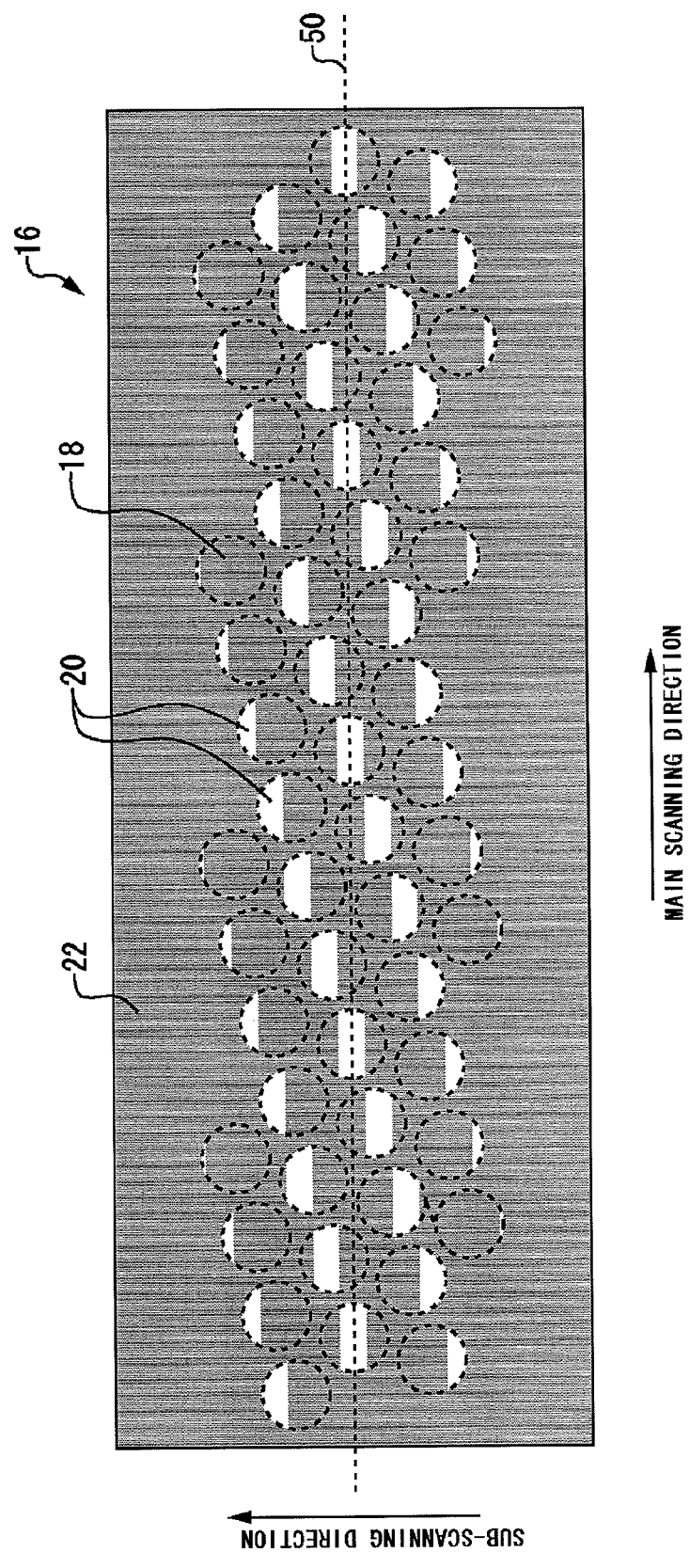
FIG. 3 is a top view of a light shielding member.

FIG. 3 is a top view of the light shielding member 16. FIG. 3 shows the convex lenses 18 by broken lines to help understand the relative positions of the convex lenses 18 and slit openings 20. The light shielding member 16 ensures that each of the convex lenses 18 transmits light in a region in which the effective region of the convex lens 18 overlaps the slit opening 20 having a regular width substantially parallel with the main scanning direction and that light is totally prevented from being transmitted in the other regions. The term "effective region of a lens" refers to a portion having the function of a lens. The term "substantially parallel" means close to parallel and encompasses lines intersecting at an angle of, for example, 10° or less, and wavy lines the longitudinal axes of which are parallel.

As shown in FIG. 3, the light shielding member 16 is configured such that one slit opening 20 is formed for each convex lens 18. The slit opening 20 restricts the light transmitting region of each convex lens 18. The regions of the light shielding member 16 other than the slit openings 20 are covered by a light absorbing layer, totally shielding light.

The light shielding member 16 may be implemented by printing a light absorbing layer on the surface of a film having high light transmittance and forming the slit openings 20 accordingly, or by providing holes in a film having low light transmittance and forming the slit openings 20 accordingly.

The slit opening 20 is formed in the neighborhood of a position in the intermediate plane occurring in the direction of stack in the erecting equal-magnification lens array plate 10 where an inverted image of the light source B is formed. Since the position where an inverted image of the light source B is formed differs from lens to lens, the position of the slit opening 20 differs from lens to lens. For example, in the case of the convex lens 18 the center of which is located on the reference plane 50, the center of the slit opening 20 is aligned with the lens center. The farther the lens center from the reference plane 50, the farther the center of the slit opening 20 from the lens center. The shape and position of the slit opening 20 will be described in detail later. By providing the light shielding member 16 formed with the slit openings 20 as shown in FIG. 3 between the first lens array plate 12 and the second lens array plate 14, it is possible to eliminate light not contributing to imaging, while transmitting light contributing to imaging onto the image plane.

Figure 4:
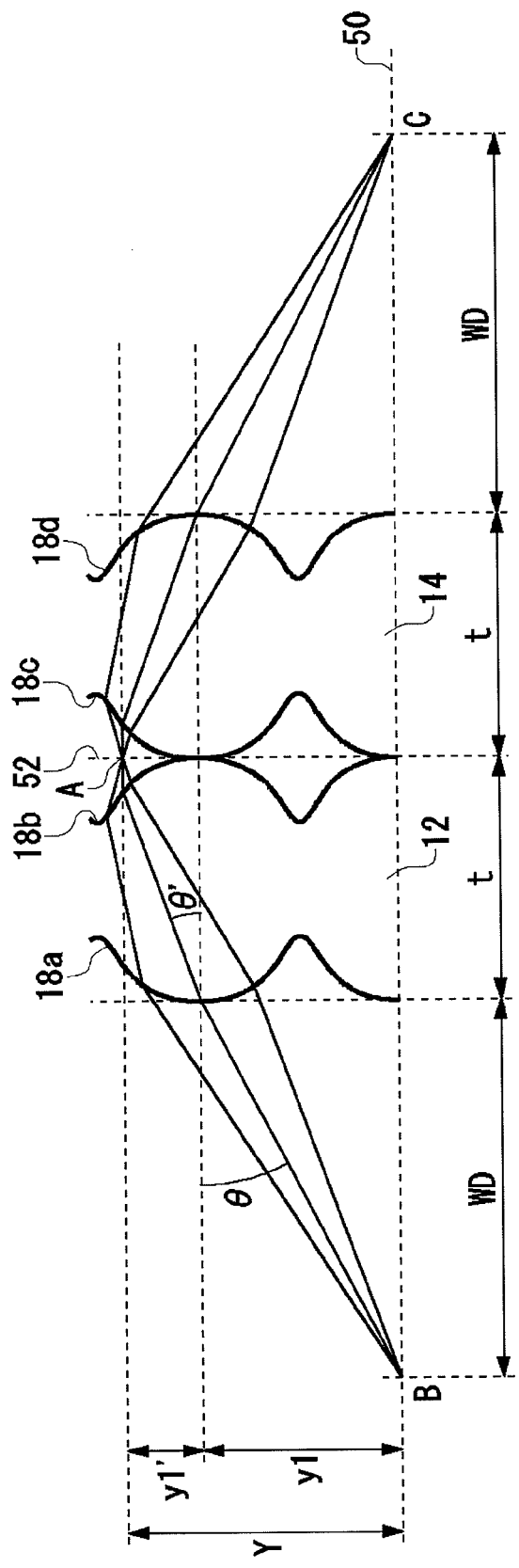
FIG. 4 illustrates a position where a slit opening is formed.

FIG. 4 illustrates a position where the slit opening 20 is formed. FIG. 4 shows the first lens array plate 12 and the second lens array plate 14 arranged such that the corresponding lenses are in contact. Referring to FIG. 4, the vertical direction in the illustration represents the sub-scanning direction (lateral direction) of the erecting equal-magnification lens array plate 10 and the depth direction in the illustration represents the main scanning direction (longitudinal direction).

Referring to FIG. 4, the light emitted by the light source B is condensed by the convex lenses 18a and 18b of the first lens array plate 12 so that an inverted image A is formed on an intermediate plane between the first lens array plate 12 and the second lens array plate 14. The intermediate plane on which the inverted image is formed will be referred to as an inverted image formation plane 52. The inverted image A is condensed by the convex lenses 18c and 18d of the second lens array plate 14 so that an erect equal-magnification image C is formed on the image plane.

Figure 5:
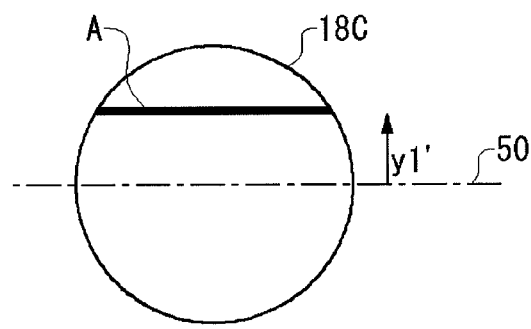
FIG. 5 shows an inverted image A on an inverted image formation plane.

FIG. 5 shows an inverted image A on the inverted image formation plane 52. Since the erecting equal-magnification lens array plate 10 is applied to an optical system using a line light source, the inverted image A will become a substantially straight line, as shown in FIG. 5. The aperture of the convex lens is spherical. However, only the region of the lens forming the inverted image A is used for imaging. Therefore, the slit opening 20 may be formed around the region.

Referring back to FIG. 4, given that the lens array plate has a plate thickness t and a refractive index n, the lens's working distance is denoted by WD, and assuming that the light from the light source B on the reference plane 50 located at a distance y1 from the lens center is condensed so as to form the inverted image A at a distance y1' from the lens center, a distance y1' from the lens center to the inverted image A is obtained as follows.

Given that the angle of incidence of light entering the convex lens 18a from the light source B is denoted by θ, and the refractive angle of light entering the convex lens 18a is denoted by θ', Snell's law requires that the relation of expression (1) holds between θ and θ'.

$$\sin θ = n \times \sin θ' \quad (1)$$

Referring to FIG. 4, the relations of expressions (2) and (3) hold.

$$\tan θ = y1/WD \quad (2)$$

$$\tan θ' = y1'/t \quad (3)$$

Approximating such that $\sin θ \cong \tan θ$ and $\sin θ' \cong \tan θ'$, expression (4) below is derived from expressions (1)-(3).

$$y1'/y1 = t/(WD \times n) \quad (4)$$

Since t/(WD×n) on the right side of expression (4) is a constant, the position at which the inverted image A is formed is displaced from the lens center by an amount proportional to distance y1 between the reference plane 50 and the lens center.

Since a distance Y between the reference plane 50 and the inverted image A is denoted by Y=y1+y1', the relation of expression (5) below holds.

$$Y/y1 = 1 + t/(WD \times n) \quad (5)$$

Since 1+t/(WD×n) on the right side of expression (5) is a constant (hereinafter, the constant will be referred to as F as appropriate), the distance Y between the reference plane 50 and the inverted image A is the distance y1 between the reference plane 50 and the lens center multiplied by a predetermined factor F. The position at which the inverted image A is formed is calculated for each convex lens 18 according to expression (5). The slit opening 20 is formed such that the center of the width thereof in the sub-scanning direction lies at the calculated position. In this way, imaging light is properly transmitted, while stray light is eliminated.

In this embodiment, the slit opening 20 is formed such that the center thereof lies at the position where the inverted image A is formed. However, the opening may be formed in the neighborhood of a position where the inverted image A is formed instead of exactly where the inverted image A is formed. That is, it would be required to form the slit opening 20 so that the light contributing to the formation of the inverted image A is transmitted. For example, the slit opening 20 may be directly formed at the position on the surface of the lower convex lens 18 of the first lens array plate 12 where the light contributing to the formation of the inverted image A passes, or at the position of the surface of the upper convex lens 18 of the second lens array plate 14 where the light contributing to the formation of the inverted image A passes, using a printing method or a photoresist process.

A description will now be given of the width of the slit opening 20 in the sub-scanning direction. As mentioned earlier, the slit opening 20 is formed in the neighborhood of a position on the inverted image formation plane 52 where the inverted image is formed. It would be sufficient, for the purpose of transmitting imaging light, for the width of the opening to be equal to the width of the imaging light. It is preferable, however, to ensure that the width of the slit opening 20 in the sub-scanning direction be as large as possible to facilitate the step of aligning the first lens array plate 12, the second lens array plate 14, and the light shielding member 16. By facilitating the alignment step, the manufacturing cost is reduced.

Figure 6:
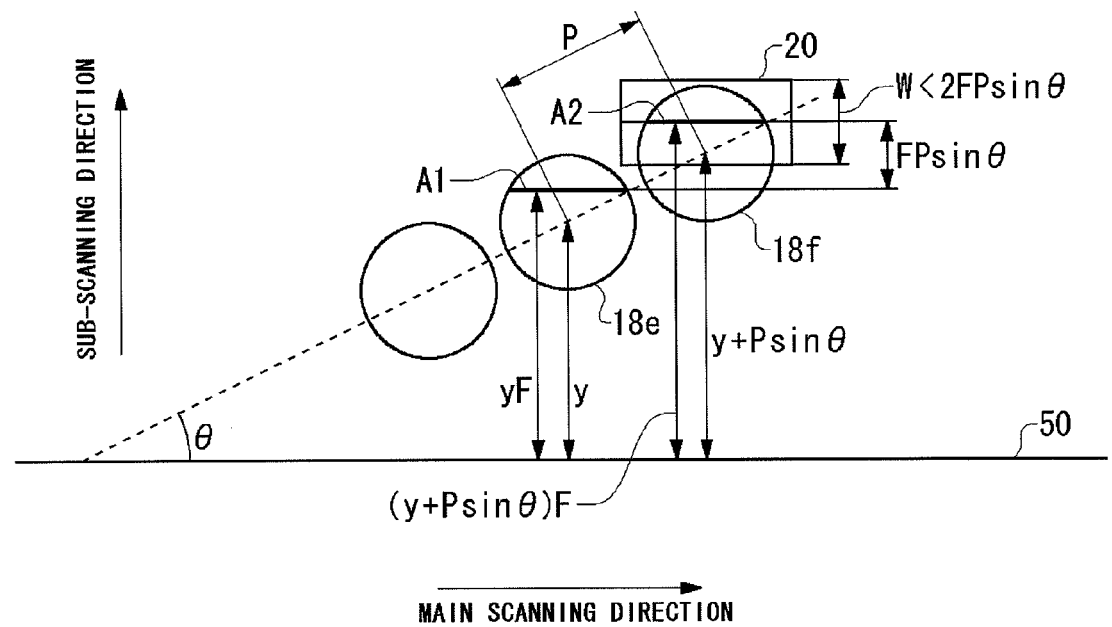
FIG. 6 illustrates the width w of the slit opening in the sub-scanning direction.

FIG. 6 illustrates the width w of the slit opening 20 in the sub-scanning direction. It will be assumed that the convex lenses 18e and 18f are arranged at a pitch P and a lens arrangement angle θ. The pitch P represents an interval between two lenses arranged in the main lens arrangement direction. Given that a distance between the center of the convex lens 18e and the reference plane 50 is denoted by y, a distance between the center of the convex lens 18f adjacent to the convex lens 18e and the reference plane 50 is given by y+P×sin θ. A distance between an inverted image A1 formed by the convex lens 18e and the reference plane 50 is given by y×F, and a distance between an inverted image A2 formed by the convex lens 18f and the reference plane 50 is given by (y+P×sin θ)×F. Accordingly, a distance between the inverted image A1 and the inverted image A2 in the sub-scanning direction is given by F×P×sin θ.

For the purpose of preventing stray light transmitted by the convex lens 18e and passing through the position in the sub-scanning direction where the inverted image A1 is formed by the convex lens 18e from being transmitted by the slit opening 20, it will be ensured that half a distance w/2 of the width w of the slit opening 20 associated with the convex lens 18f in the sub-scanning direction is smaller than the distance F×P×sin θ between the inverted image A1 and the inverted image A2, assuming that the width of the inverted image A1 in the sub-scanning direction is negligibly small. In other words, it would be required for the width of the slit opening 20 in the sub-scanning direction to be in the range of expression (6) below.

$$w < 2 \times F \times P \times \sin θ \quad (6)$$

Thus, the width w of the slit opening 20 in the sub-scanning direction should be smaller than 2×F×P×sin θ on the right side of expression (6) in order to shield stray light. In this regard, the right side of expression (6) will be referred to as a marginal opening width wmax.

$$w\text{max} = 2 \times F \times P \times \sin θ \quad (7)$$

Figure 7:
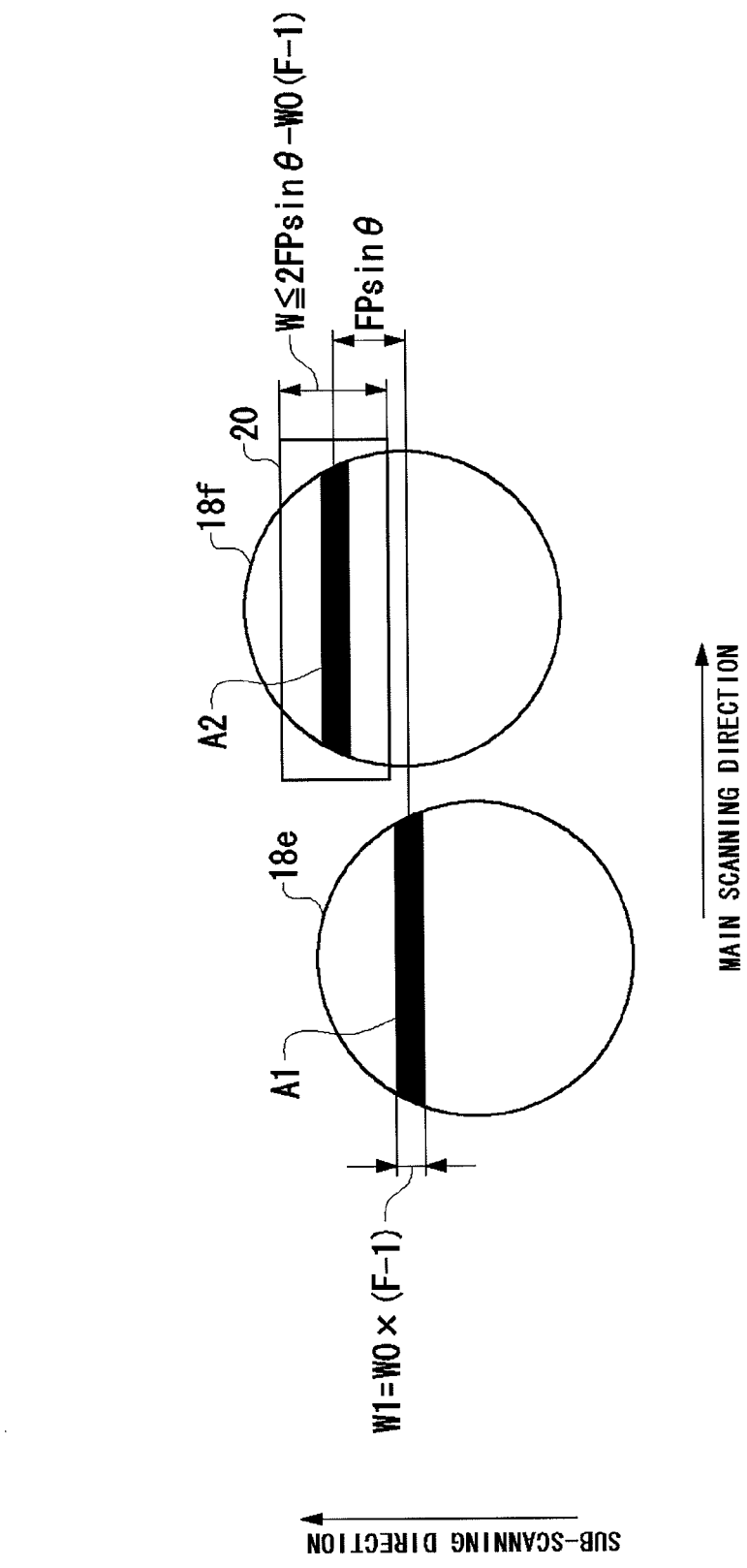
FIG. 7 illustrates the width w of the slit opening in the sub-scanning direction required when the width of an inverted image is not negligible.

FIG. 7 illustrates the width w of the slit opening 20 in the sub-scanning direction required when the width of an inverted image is not negligible. It is assumed in expression (6) that the width of the inverted image A1 in the sub-scanning direction is negligibly small to define the width w of the slit opening 20 in the sub-scanning direction. There are cases, however, where the width of the inverted image A1 is not negligible. For example, a CCD line image sensor adapted for RGB colors need be formed on the image plane such that three CCDs respectively corresponding to RGB are arranged in the sub-scanning direction. To ensure that light is incident on the three CCDs, it is necessary to form an erect equal-magnification image having a width at least as large as the width of the three CCDs on the image plane. In this case, since the inverted image formed on the inverted image formation plane has a certain width in the sub-scanning direction, the width w of the slit opening 20 need be limited beyond what is called for in expression (6), in order to ensure that the inverted image A1 formed by the convex lens 18e is not transmitted by the slit opening 20.

It will be assumed that the width of the erect equal-magnification image required on the image plane (hereinafter, referred to as required image plane width) will be denoted by w0. The required image plane width w0 is equal to the width occupied by three CCDs in case a CCD line image sensor comprising three CCDs is provided on the image plane. Since the erecting lens array according to this embodiment is an erecting equal-magnification lens array, the width of the light source B in the sub-scanning direction is also denoted by w0. When the light from the light source B having the width w0 in the sub-scanning direction enters the convex lens 18e, a width w1 of the inverted image A1 formed on the inverted image formation plane will be given by w0×(F−1). For example, given that w0=20 μm and F=1.25, w1=5 μm.

Accordingly, as shown in FIG. 7, stray light transmitted by the convex lens 18e and passing through the position in the sub-scanning direction where the inverted image A1 is formed by the convex lens 18e will be prevented from being transmitted by the slit opening 20, if half the distance w/2 of the width w of the slit opening 20 in the sub-scanning direction is no larger a value obtained by subtracting half the width w1 of the inverted image A1 in the sub-scanning direction, i.e., w1/2, from the distance F×P×sin θ between the inverted image A1 and the inverted image A2 in the sub-scanning direction. More specifically, it would be necessary for the width w of the slit opening 20 in the sub-scanning direction to be within the range given by expression (8) below.

$$w \leq 2 \times F \times P \times \sin\theta - w0 \times (F-1) \quad (8)$$

Since the slit opening 20 should completely transmit the light forming the inverted image A2 formed by the convex lens 18f, the width w in the sub-scanning direction need be no smaller than a width w2 of the inverted image A2, i.e., no smaller than w0×(F−1). Therefore, the width w of the slit opening 20 in the sub-scanning direction is desirably within the range given by expression (9) below.

$$w0 \times (F-1) \leq w \leq 2 \times F \times P \times \sin\theta - w0 \times (F-1) \quad (9)$$

Figure 8:
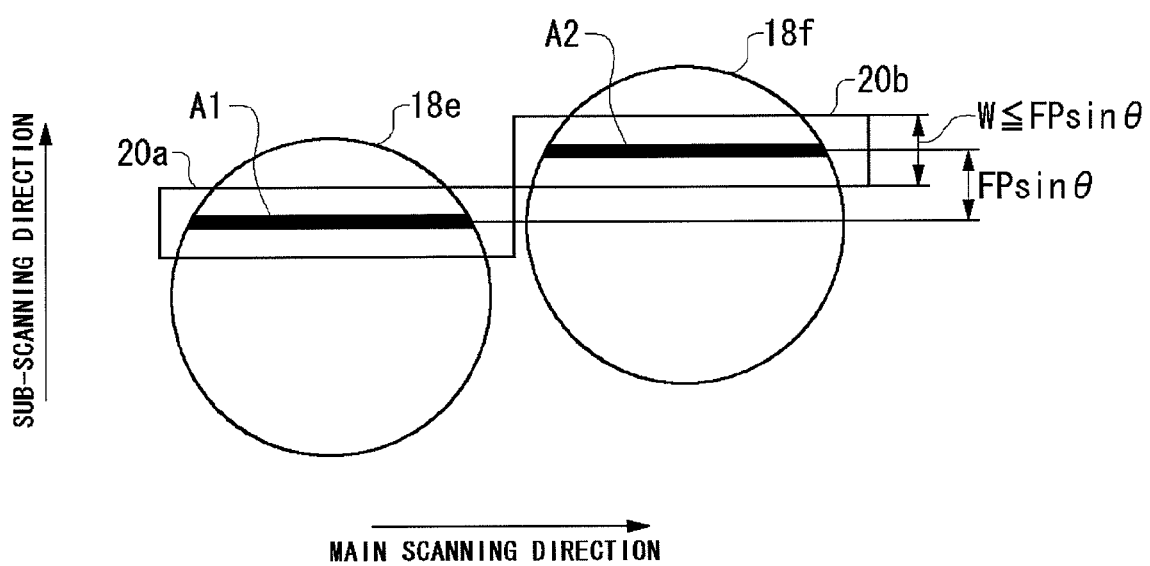
FIG. 8 illustrates the width w of the slit opening required in the sub-scanning direction to keep the on the safe side.

FIG. 8 illustrates the width w of the slit opening 20 in the sub-scanning direction required to keep the on the safe side. By ensuring that the slit opening 20a corresponding to the convex lens 18e does not overlap the slit opening 20b corresponding to the convex lens 18f in the sub-scanning direction, the likelihood of the stray light, transmitted by the convex lens 18e and passing through the position in the sub-scanning direction where the inverted image A1 is formed by the convex lens 18e, being transmitted through the slit opening 20b is minimized. In other words, it would be necessary for the width w of the slit opening 20 in the sub-scanning direction to be within the range of expression (10) below.

$$w \leq F \times P \times \sin\theta \quad (10)$$

However, the smaller the width w of the slit opening 20 in the sub-scanning direction, the smaller the amount of transmitted light for forming an erect equal-magnification image. It is therefore desirable that the opening width is as large as possible. Accordingly, it is more desirable that the width w of the slit opening 20 in the sub-scanning direction be the value given by expression (11) below.

$$W = F \times P \times \sin\theta \quad (11)$$

It would be necessary for the width of the slit opening 20 in the main scanning direction to be equal to the diameter of the convex lens 18.

Figure 9:
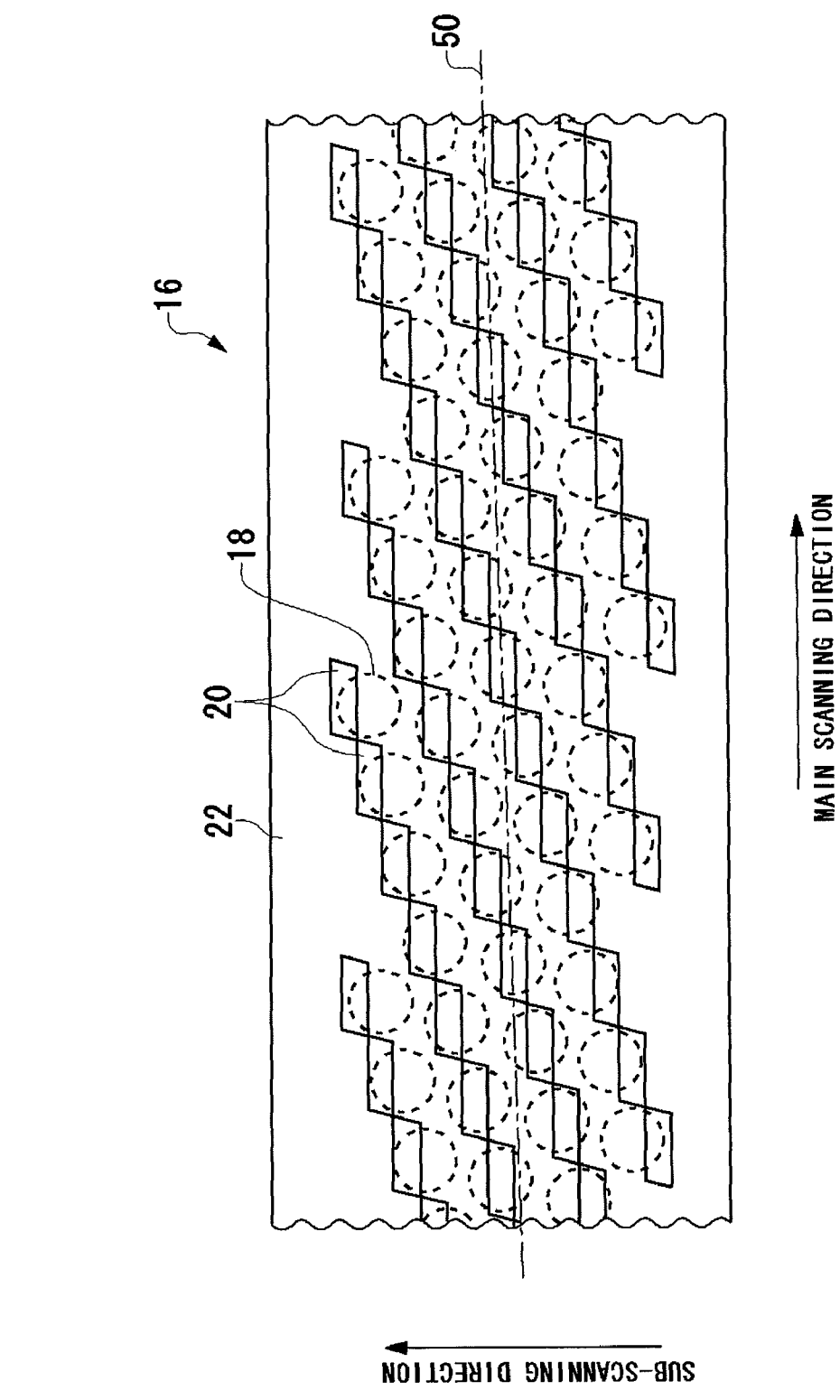
FIG. 9 shows the relative position of the slit openings and convex lenses.

Described above is the position where the slit opening 20 is formed and the width thereof in the sub-scanning direction. FIG. 9 shows the relative position of the slit openings 20 and the convex lenses 18. The member of FIG. 3 establishes a light transmitting region in each of the lenses 18 where the slit opening 20 of FIG. 9 and the convex lens 18 overlap.

Figure 10:
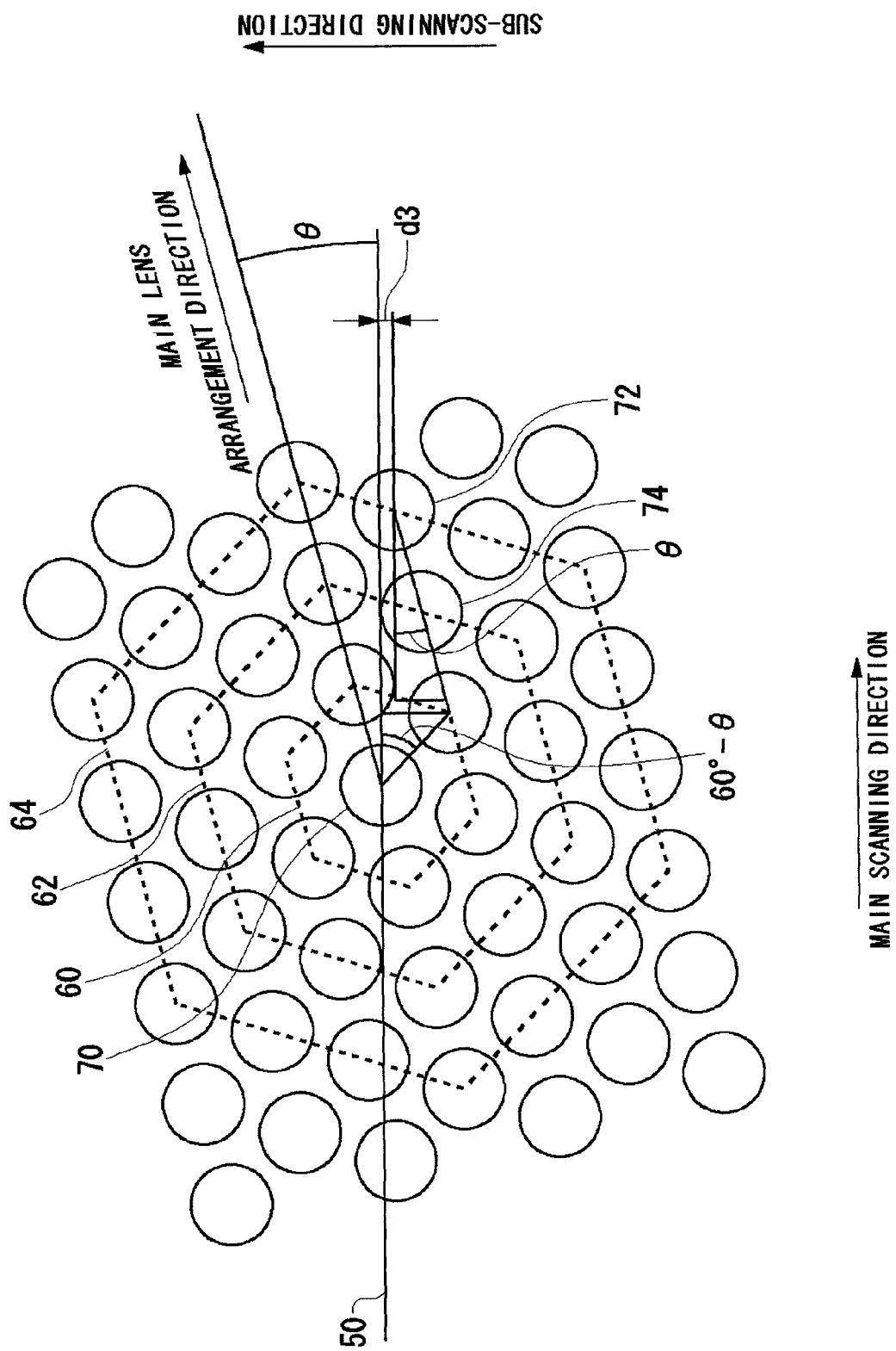
FIG. 10 illustrates how lenses other than the adjacent lenses are considered in determining the width w of the slit opening in the sub-scanning direction.

FIG. 10 illustrates how lenses other than the adjacent lenses are considered in determining the width w of the slit opening in the sub-scanning direction. Designating the convex lens the center of which is located on the reference plane 50 as a reference lens 70, the convex lenses adjacent to the reference lens 70 and located on a dotted line 60 will be referred to as the first adjacent lenses. The convex lenses surrounding the first adjacent lenses and located on a dotted line 62 will be referred to as the second adjacent lenses. The convex lenses surrounding the second adjacent lenses and located on a dotted line 64 will be referred to as the third adjacent lenses. Of the angles formed by two straight lines connecting the lens center of the reference lens 70 and the lens centers of the two adjacent lenses of the first adjacent lenses, the smaller will be referred to as the first lens abutting angle. The first lens abutting angle is determined by the lens arrangement pattern. In the case of a hexagonal arrangement as shown in FIG. 10, the first lens abutting angle is 60°. In the case of a square arrangement, the first lens abutting angle is 90°.

Expressions (6), (8), and (9) define the width w of the slit opening 20 in the sub-scanning direction considering the relative position of the reference lens 70 and the first adjacent lenses, stray light arrives via lenses other than the first adjacent lenses. Stray light from lenses remote from the reference lens 70 exercises little influence. Therefore, the relation between the reference lens 70 and the second adjacent lenses and the relation between the reference lens 70 and the third adjacent lenses will be considered in this embodiment.

As the lens arrangement angle θ is increased beyond 0°, a third adjacent lens 72 will be located at the same sub-scanning direction position as the reference lens 70 in advance of those in the other groups. In the case of hexagonal arrangement, the position of the reference lens 70 in the sub-scanning direction will be identical to that of the third adjacent lens 72, when the lens arrangement angle θ=19.1°.

A distance d3 between the reference plane 50 and the lens center of the third adjacent lens 72 will be given by expression (12) below when the lens arrangement θ is in a range 0°<θ<19.1°.

$$d3 = P \times \{ \sin(60° - \theta) - 2 \times \sin\theta \} \quad (12)$$

Since a distance d3' between the inverted image formed by the reference lens 70 and the inverted image formed by the third adjacent lens 72 in the sub-scanning direction is F times the distance d3, d3' will be given by $$d3' = F \times P \times \{ \sin(60 + -\theta) - 2 \times \sin\theta \} \quad (13)$$

Accordingly, the width w of the slit opening in the sub-scanning direction is set within the range defined by expression (14) below, if the third adjacent lens 72 in the neighborhood of the reference lens 70 is considered.

$$w < 2 \times F \times \{ P \times \{ \sin(60° - \theta) - 2 \times P \times \sin\theta \} \quad (14)$$

Accordingly, if the lens arrangement angle is within the range 0°<θ<19.1°, it is desirable that the width w of the slit opening in the sub-scanning direction be set so that expressions (6) and (14) are both fulfilled in consideration of the first adjacent lenses and the third adjacent lenses. By setting the width w of the slit opening in the sub-scanning direction within such a range, stray light can be suitably eliminated.

As the lens arrangement angle θ is increased beyond 19.1°, a second adjacent lens 74 will be located at the same sub-scanning direction position as the reference lens 70 in advance of those in the other groups. In the case of hexagonal arrangement, the position of the reference lens 70 in the sub-scanning direction will be identical to that of the second adjacent lens 74, when the lens arrangement angle θ=30°.

A distance d3 between the reference plane 50 and the lens center of the third adjacent lens 72 will be given by expression (15) below when the lens arrangement angle θ is such that 19.1°<θ<30°.

$$d3 = P \times \{ 2 \times \sin\theta - \cos(30° + \theta) \} \quad (15)$$

Since a distance d3' between the inverted image formed by the reference lens 70 and the inverted image formed by the third adjacent lens 72 in the sub-scanning direction is F times the distance d3 of expression (15), d3' will be given by $$d3'=F\times P\times\{2\times\sin\theta-\cos(30°+\theta)\} \quad (16)$$

Accordingly, the width w of the slit opening in the sub-scanning direction is set within the range defined by expression (17) below, if the lens arrangement angle θ is such that 19.1°<θ<30° and if the third adjacent lens 72 in the neighborhood of the reference lens 70 is considered.

$$w<2\times F\times P\times\{2\times\sin\theta-\cos(30°+\theta)\} \quad (17)$$

A distance d2 between the reference plane 50 and the lens center of the second adjacent lens 74 will be given by expression (18) below when the lens arrangement θ is such that 19.1°<θ<30°.

$$d2=P\times\{\sin(60°-\theta)-\sin\theta\} \quad (18)$$

Since a distance d2' between the inverted image formed by the reference lens 70 and the inverted image formed by the second adjacent lens 74 in the sub-scanning direction is F times the distance d2 of expression (18), d2' will be given by $$d'=F\times P\times\{\sin(60°-\theta)-\sin\theta\} \quad (19)$$

Accordingly, the width w of the slit opening in the sub-scanning direction is set within the range defined by expression (20) below, if the lens arrangement angle θ is such that 19.1°<θ<30° and if the second adjacent lens 74 in the neighborhood of the reference lens 70 is considered.

$$w<2\times F\times P\times\{\sin(60°-\theta)-\sin\theta\} \quad (20)$$

Accordingly, if the lens arrangement angle θ is such that 19.1°<θ<30°, it is desirable that the width w of the slit opening in the sub-scanning direction be set so that expressions (6), (17), and (20) are all fulfilled in consideration of the first adjacent lenses, the second adjacent lenses, and the third adjacent lenses. By setting the width w of the slit opening in the sub-scanning direction within such a range, stray light can be suitably eliminated.

Figure 11:
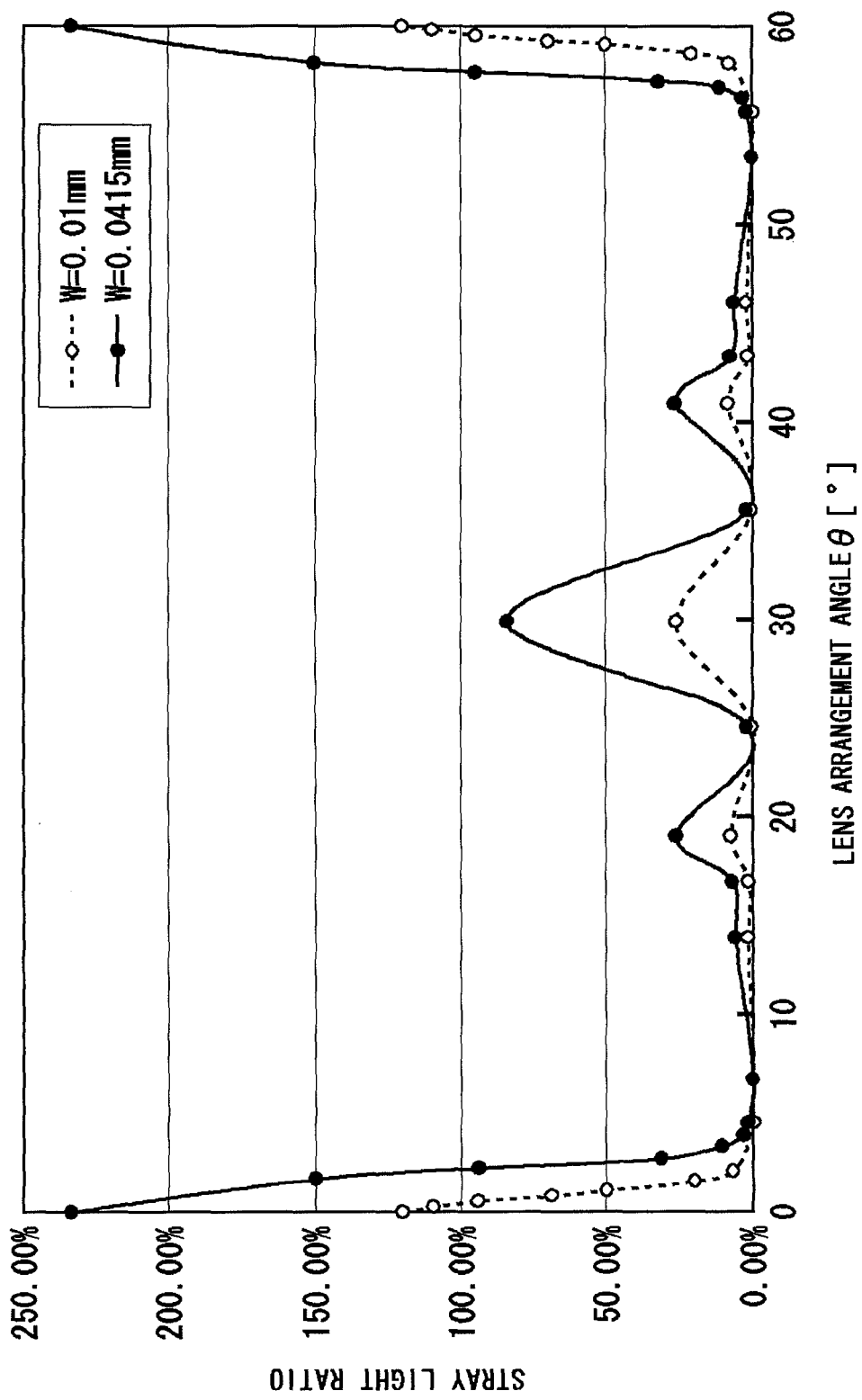
FIG. 11 is a graph showing a relation between the lens arrangement angle θ and stray light ratio in the erecting equal-magnification lens array according to the embodiment.

FIG. 11 is a graph showing a relation between the lens arrangement angle θ and stray light ratio in the erecting equal-magnification lens array 10 according to this embodiment. A ray tracing simulation was conducted to calculate stray light ratio occurring when the lens arrangement angle θ is varied. The entirety of the erecting equal-magnification lens array plate 10 is illuminated in the main scanning direction in a Lambertian distribution by a substantially straight ray of light representing the light source B. The amount of light arriving at a specific line on the image plane is designated as the amount of light transmitted. The amount of light arriving elsewhere is designated as the amount of stray light. A stray light ratio is defined as a sum of the amount of stray light divided by the amount of light transmitted. A curve connecting the dots in FIG. 11 merely joins the points (calculated values) smoothly.

The conditions of simulation are such that the lens arrangement is a hexagonal arrangement, the lens's working distance WD=6.7 mm, the plate thickness t of the lens array plate is such that t=2.4 mm, the lens pitch P=0.42 mm, the lens diameter D=0.336 mm, the refractive index n=1.53, the curvature radius=0.679 mm, and the TC conjugation length=18.2 mm. Two simulations were conducted assuming that the width w of the slit opening in the sub-scanning direction is 0.01 mm and that w is 0.0415 mm. As shown in FIG. 11, since the lens arrangement is hexagonal, the graph of stray light ratio presents symmetry around the lens arrangement angle θ=30° due to the symmetry of the lens arrangement.

As shown in FIG. 11, given that the lens arrangement angle θ=0°, the stray light ratio is as large as 120% when w=0.01 mm and as large as 232% when w=0.0415 mm. As the lens arrangement angle θ is increased, the stray light ratio is lowered.

A study will be made to determine the range the lens arrangement angle θ should reside in order to reduce stray light suitably, assuming that the w of the slit opening in the sub-scanning direction is 0.01 mm. As mentioned above, the width w of the slit opening in the sub-scanning direction need be set to a value smaller than the marginal opening width wmax in order to reduce stray light suitably.

Assuming the marginal opening width wmax of 0.01 mm, the lens arrangement angle θ1 will be determined as θ1=0.55° from expression (7). FIG. 11 shows that the stray light ratio drops to sub-100% level (94.76%) when the lens arrangement angle θ1=0.55°. Assuming the marginal opening width wmax 0.415 mm, the lens arrangement angle θ1 will be determined as θ1=2.3° from expression (7). FIG. 11 shows that the stray light ratio drops to sub-100% level (93.65%) when the lens arrangement angle θ1=2.3°. Accordingly, it is desirable that the lens arrangement angle θ be set to be larger than θ1 that fulfills the condition $$w=2\times F\times P\times\sin\theta1 \quad (21)$$

in order to reduce stray light suitably.

As mentioned, the stray light ratio is plotted on a graph symmetrical around θ=30°. Therefore, it is desirable that the lens arrangement angle θ be smaller than an angle θ2 obtained by subtracting θ1 from 60°, the first lens abutting angle. θ2=59.45° when the width w of the slit opening in the sub-scanning direction is such that w=0.01 mm, and θ2=57.7° when w=0.0415 mm.

To summarize the above, it is desirable that the lens arrangement angle θ be set to be larger than the angle θ1 that fulfills expression (21) and smaller than the angle θ2 obtained by subtracting the angle θ1 from the first lens abutting angle.

It is desirable that the lens arrangement angle θ be no smaller than the angle θ1 plus 1° and no larger than the angle θ2 minus 1°. For example, when the width w of the slit opening in the sub-scanning direction is such that w=0.01 mm, the lens arrangement angle θ is set within the range 1.55°≦θ≦58.45°. When w=0.0415 mm, θ is set within the range 3.3°≦θ≦56.7°. The stray light ratio is 21.06% when w=0.01 mm, and 11.22% when w=0.0415 mm, demonstrating that the ratio is smaller than that occurring at the arrangement angle θ4 mentioned later. By setting the lens arrangement angle θ within such a range, stray light is more suitably reduced.

As shown in FIG. 11, the stray light ratio has maximum values when the lens arrangement angle θ=19.1° and when θ=30°, both when the width w of the slit opening in the sub-scanning direction is such that w=0.01 mm and when w=0.415 mm. At the lens arrangement angle θ=19.1°, the reference lens 70 and the third adjacent lens 72 are located at the same position in the sub-scanning direction, resulting in the maximum value of the ratio, as described with reference to FIG. 10. At the lens arrangement angle θ=30°, the reference lens 70 and the second adjacent lens 74 are located at the same position in the sub-scanning direction, also resulting in the maximum value of the ratio.

Accordingly, it is desirable that the lens arrangement angle θ be not set at a lens arrangement angle θ3 where the reference lens and the third adjacent lens are located at the same position in the sub-scanning direction, and at a lens arrangement angle 74 where the reference lens and the second adjacent lens are located at the same position in the sub-scanning direction. To keep on the safe side, it is desirable that the lens arrangement angle θ not be set within a range ±1° of the lens arrangement angle θ3 and a range ±1° of the lens arrangement angle θ4.

Figure 12:
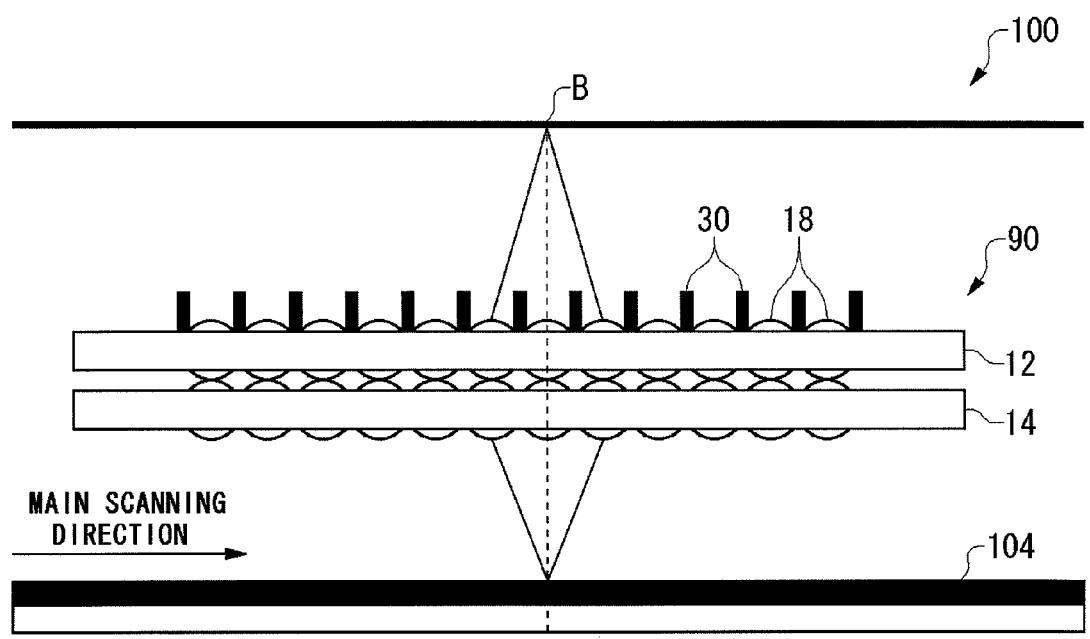
FIG. 12 shows an erecting equal-magnification lens array plate in which a light shielding wall is provided on the first lens array plate.

FIG. 12 shows an erecting equal-magnification lens array plate 90 in which a light shielding wall 30 is provided on the first lens array plate 12. FIG. 12 shows that the erecting equal-magnification lens array plate 90 is built in the image reading device 100. Illustration of the light shielding member is omitted in FIG. 12. The erecting equal-magnification lens array plate 10 shown in FIGS. 2A and 2B, which is not provided with a light shielding wall, is capable of eliminating stray light sufficiently. However, by forming the light shielding wall 30 for eliminating stray light between the convex lenses 18 on the first lens array plate 12, as shown in FIG. 12, stray light is more effectively reduced.

Figure 13A:
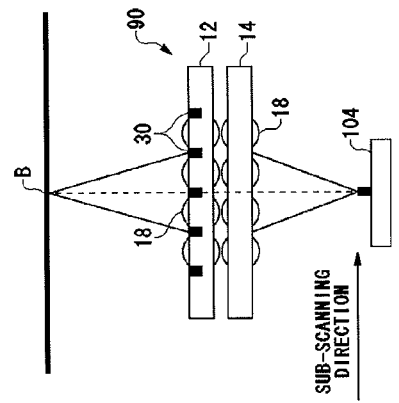
FIGS. 13A-13C show how a light shielding wall is provided by way of other examples.
Figure 13B:
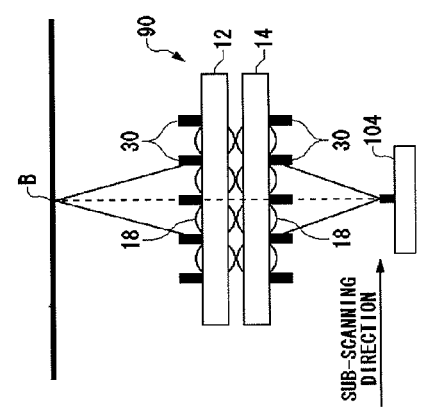
Figure 13C:
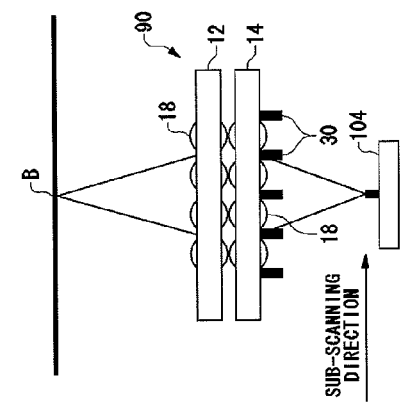

FIGS. 13A-13C show how the light shielding wall 30 is provided by way of other examples. Illustration of the light shielding member is also omitted in FIGS. 13A-13C. As shown in FIG. 13A, the light shielding wall may be provided only on the second lens array plate 14 facing the image plane. Alternatively, the wall 30 may be provided both on the first lens array plate 12 and the second lens array plate 14, as shown in FIG. 13B. As shown in FIG. 13C, the wall 30 may be embedded in the first lens array plate 12. Methods of forming the light shielding wall 30 are disclosed in, for example, JP 2005-37891 so that a detailed description is omitted.

Figure 14:
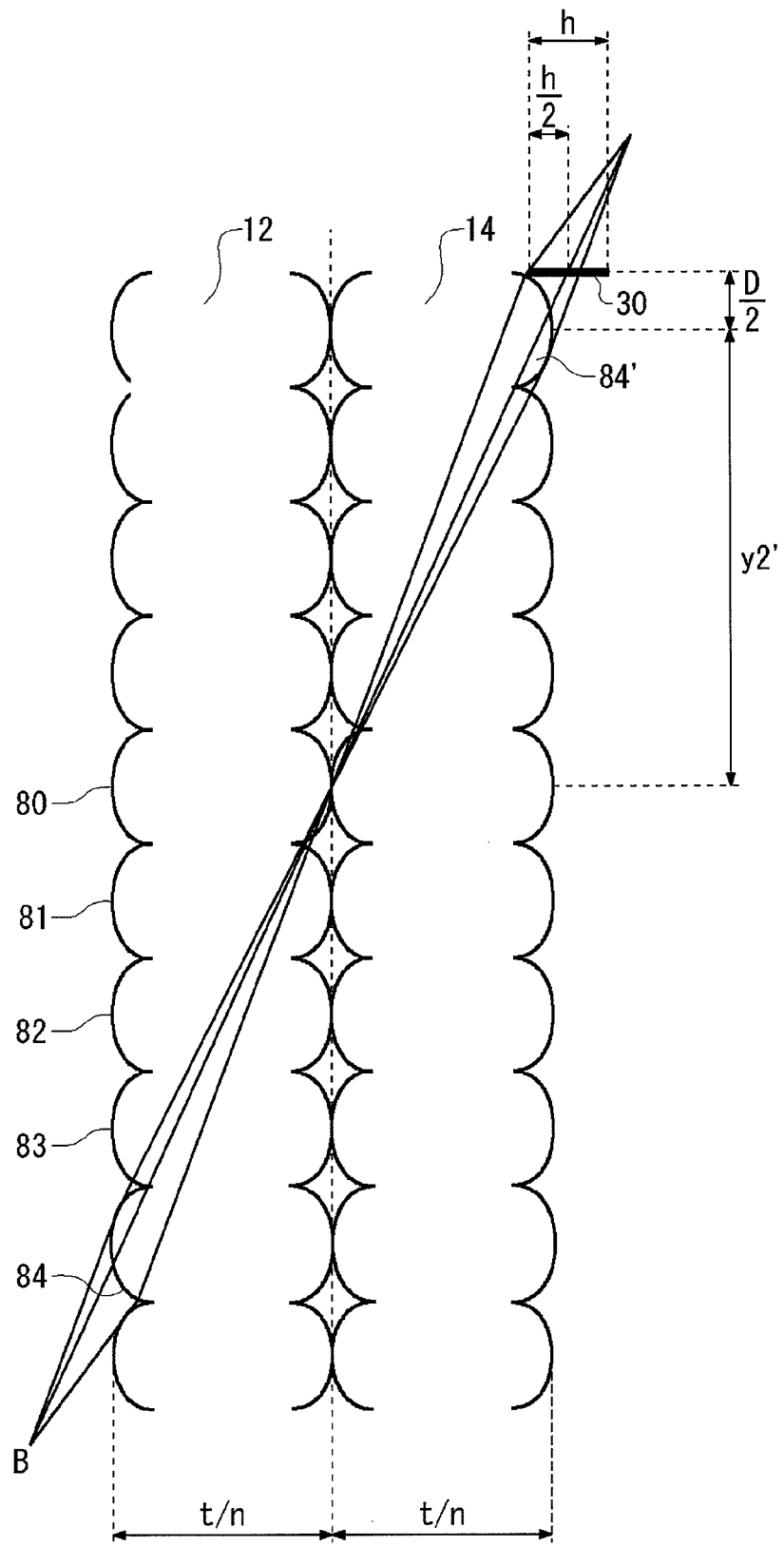
FIG. 14 illustrates the height h of a light shielding wall.

FIG. 14 illustrates a height h of the light shielding wall 30. As described with reference to FIG. 10, the light shielding member 16 according to this embodiment is capable of eliminating stray light from the first adjacent lens 81, the second adjacent lens 82, and the third adjacent lens 83 in the neighborhood of the reference lens 80, by adjusting the lens arrangement angle θ. However, stray light from the fourth adjacent lens 84 and beyond may exercise influence. The farther the lens from the reference lens 80, the smaller the amount of stray light and the smaller the influence. By eliminating stray light from remote lenses by means of the light shielding wall 30, image quality is further enhanced. A description will be given hereinafter of the conditions for eliminating stray light transmitted by the fourth adjacent lens 84 by means of the shielding wall 30. FIG. 14 depicts that light emitted from the light source B and entering the lens center is not refracted because the plate thickness t of the lens plate array is depicted at a scale 1/n.

As shown in FIG. 14 it will be assumed that the light entering the fourth adjacent lens 84 on the first lens array plate 12 is transmitted through the slit opening associated with the reference lens 80, passes through the second lens array plate 14, before leaving a fourth lens 841 on the second lens array plate 14.

Figure 15:
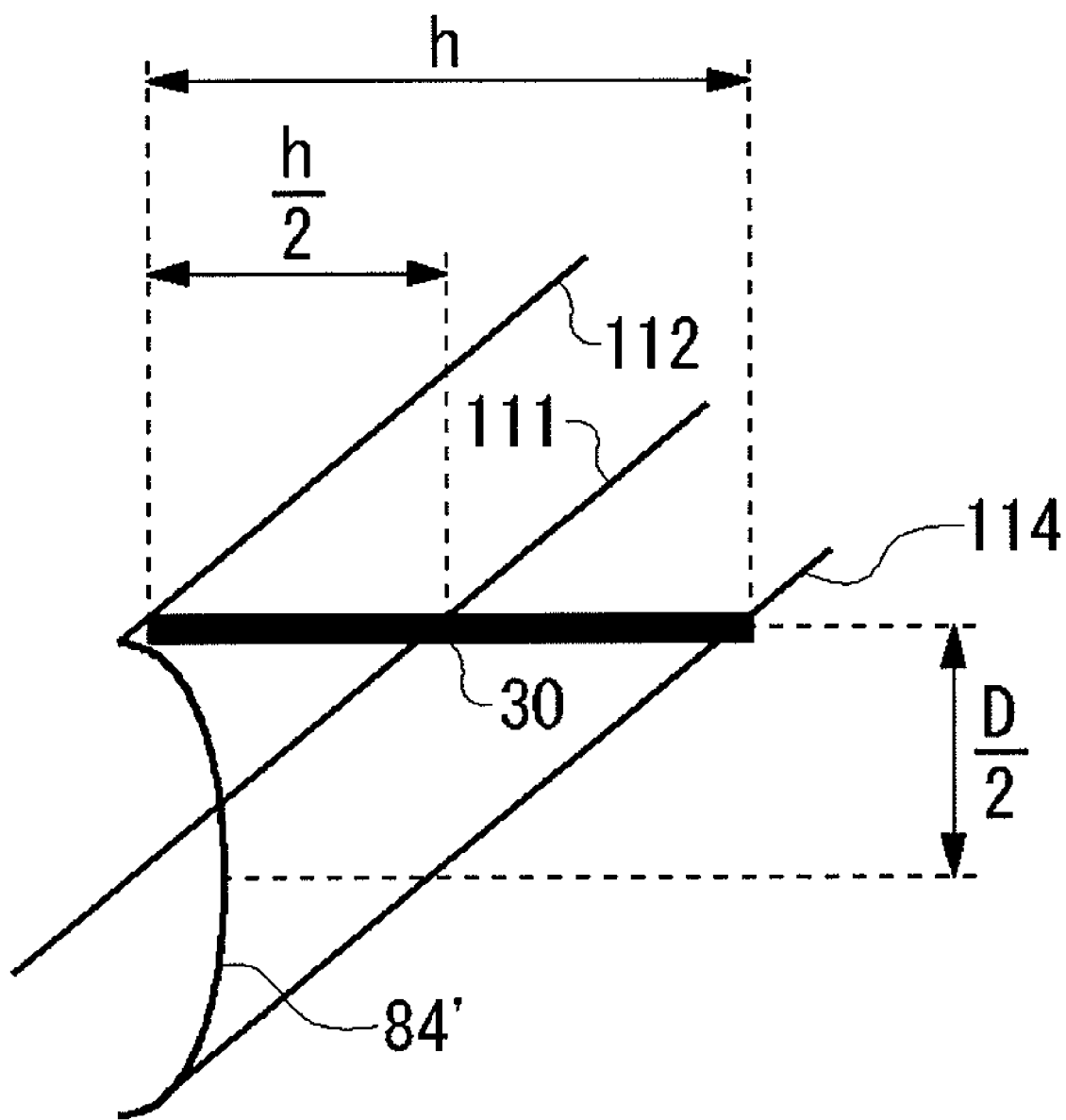
FIG. 15 is an enlarged view of the neighborhood of the fourth adjacent lens in the second lens array plate.

FIG. 15 is an enlarged view of the neighborhood of the fourth adjacent lens 84' in the second lens array plate 14. It will be assumed here that a ray 111 passing through the lens center of the fourth adjacent lens 84' and rays 112 and 114 passing through the lens edges are parallel. In this case, denoting the diameter of the lens as D and the height of the light shielding wall as h, a relation similar to that depicted in FIG. 4 holds true except that WD should be replaced by h/2, y1' should be replaced by y2' and y1 should be replaced by D/2. Accordingly, the following relation holds.

$$t/n:h/2=y2':D/2 \quad (22)$$

Modifying (22), we obtain $$h/D=t/(y2'\times n) \quad (23)$$

The height h of the light shielding wall 30 required to eliminate stray light from the fourth adjacent lens can be determined according to expression (23).

To verify the effect of the shielding wall, ray tracing simulations were conducted to calculate and compare the stray light ratio occurring when the light shielding wall is provided and when it is not. The calculation was conducted under the conditions mentioned above. A difference from the conditions observed in the aforementioned calculation is that the width w of the slit opening in the sub-scanning direction is such that w=0.13 mm and the lens arrangement angle θ is 13.9°. Calculation showed that the stray light ratio is 15.64% in the absence of the light shielding wall. When the light shielding wall of a height 0.3 mm is provided to face the light source as in FIG. 12, stray light is completely eliminated, i.e., the stray light ratio of 0.00& resulted.

Described above is the erecting equal magnification lens array plate according to the embodiment. In the erecting equal-magnification lens array plate, the light shielding member formed with the slit opening is provided on the intermediate plane between the first lens array plate and the second lens array plate. Moreover, it is ensured that the main direction of arrangement of convex lenses is different from the main scanning direction of the erecting equal-magnification lens plate. In this way, imaging light is properly transmitted, while stray light is suitably eliminated. By forming the light shielding wall at least on one surface of the erecting equal-magnification lens array plate, stray light is more suitably eliminated.

The erecting equal-magnification lens array plate according to this embodiment is capable of eliminating stray light sufficiently without using a partition having a slit opening as disclosed in patent document No. 1. Accordingly, the size and weight of the optical system can be reduced. Since the number of parts is reduced, the cost is reduced accordingly. Further, since a partition is not provided, the likelihood of light reflected by a partition turning into stray light is eliminated. Since a ghost image is prevented from being created when the plate is built in an image forming device, image quality is improved.

Since the light shielding member is provided between the lens array plates, the adjustment of position of the partition and the lens array plate is not necessary. Since the light shielding member is integral with the lens array plate, the position of the member does not vary and so can prevent stray light in a stable manner once it is secured.

Since the erecting equal-magnification lens array plate eliminates stray light but does not eliminate imaging light, the plate can form an optical system highly transmissive of imaging light and allows a bright image, and particularly an image that is bright in the sub-scanning direction, to be obtained.

The erecting equal-magnification lens array plate according to this embodiment has the capability of eliminating stray light commensurate with that of the related-art erecting equal-magnification lens array plate using a partition with a slit opening. Accordingly, the erecting equal-magnification lens array plate according to this embodiment can be used in high-quality image reading devices and image writing devices.

Figure 16A:
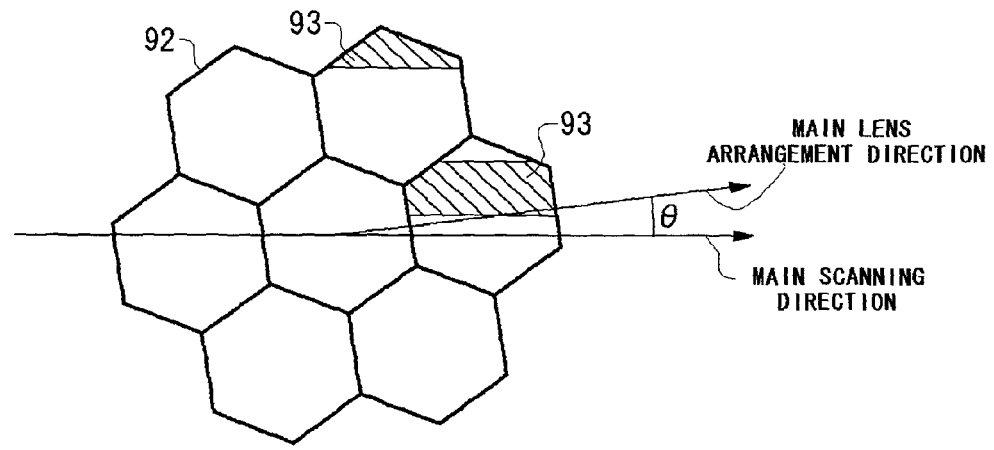
FIGS. 16A and 16B show variations of the lens shape.
Figure 16B:
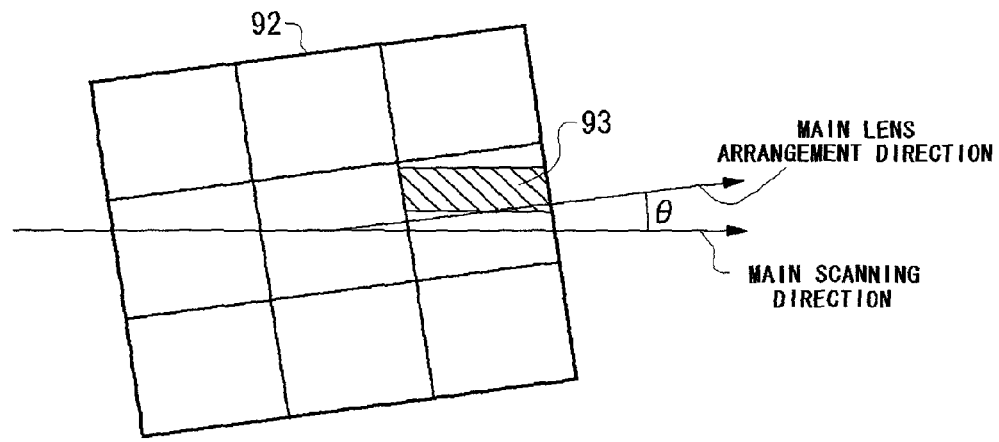

FIGS. 16A and 16B show variations of the lens shape. A lens 92 shown in FIG. 16A is a hexagonal lens and a lens 92 shown in FIG. 16B is a square lens. Stray light can also be eliminated suitably by tilting the main lens arrangement direction of these lenses with respect to the main scanning direction by the lens arrangement angle θ and providing a light shielding member having an opening 93.

Figure 17A:
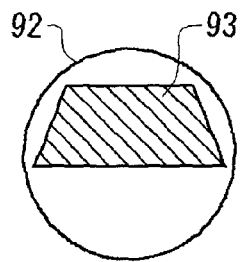
FIGS. 17A and 17B show variations of the light shielding member.
Figure 17B:
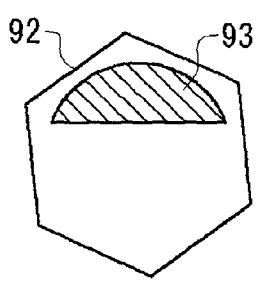

FIGS. 17A and 17B show variations of the light shielding member. Each of the lenses 92 of FIGS. 17A and 17B is provided with an opening 93 smaller than the effective region of the lens 92. As illustrated, the light shielding member may define an opening located inside the slit opening and smaller than the slit opening, by using a curve or a straight line such that transmission of light through the portions other than the opening thus defined is prevented. In this case, a portion of light transmitted through the effective region of the lens 92 is shielded so that the amount of light transmitted is slightly reduced. However, stray light can be eliminated more effectively.

Figure 18:
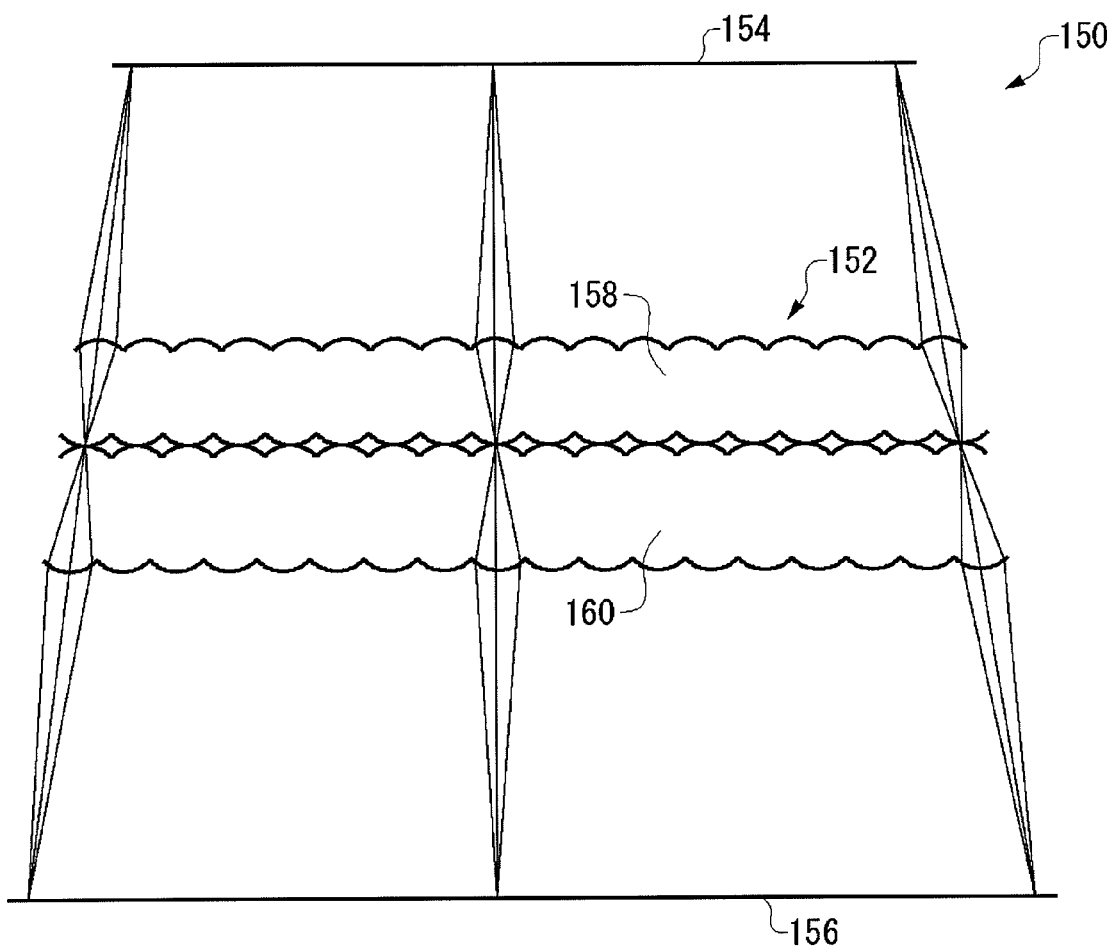
FIG. 18 shows an imaging optical system using an erecting magnifying and reducing lens array plate.

FIG. 18 shows an imaging optical system 150 using an erecting magnifying and reducing lens array plate 152. As shown in FIG. 18, the erecting magnifying and reducing lens array plate 152 can be formed by ensuring that the lens diameter of the lenses of a first lens array plate 158 is different from that of the lenses of a second lens array plate 160. The erecting magnifying and reducing lens array plate 152 shown in FIG. 18 receives substantially straight light from a light source 154 and forms an erect magnified image on an image plane 156. In the erecting magnifying and reducing lens array plate 152, as in the erecting equal-magnification lens array plate 10 shown in FIG. 2, stray light can be eliminated suitably by providing a light shielding member (not shown) formed with a slit opening and by ensuring that the main lens arrangement direction differs from the main scanning direction.

Figure 19:
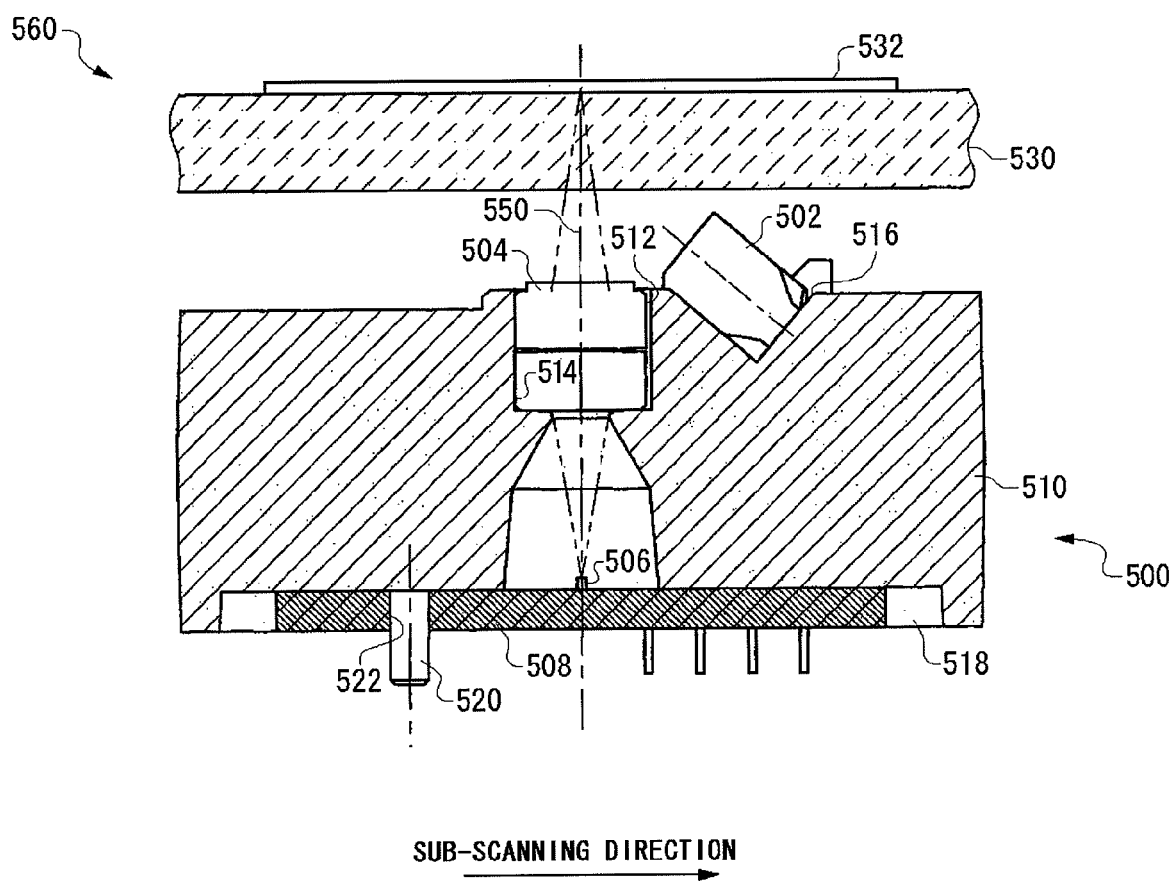
FIG. 19 is a schematic sectional view of an image sensor unit using an erecting equal-magnification lens array plate.

FIG. 19 is a schematic sectional view of an image sensor unit using an erecting equal-magnification lens array plate. The image sensor unit 500 shown in FIG. 19 is used by being built in an image reading device 560 such as a scanner and a copier. The image sensor unit 500 is a substantially cubic module and is built in the image reading device 560 such that the longitudinal direction thereof is aligned with the main scanning direction and the lateral direction thereof is aligned with the sub-scanning direction. In addition to the image sensor unit 500, FIG. 19 shows a glass plate 530 operable as a document table of the image reading device 560 and a document 532 placed on the glass plate 530. The document 532 can be scanned by running the image sensor unit 500 in the sub-scanning direction. The image reading device 560 is provided with an image processor (not shown in FIG. 19) for processing an image signal detected by the image sensor unit 500.

As shown in FIG. 19, built in a housing 510 of the image sensor 500 are a line light source 502 for illuminating the document 532 to be scanned, an erecting equal-magnification lens array plate 504 for condensing light reflected by the document 532, and a board 508 provided with a CCD line image sensor 506 as a light-receiving device for receiving light transmitted by the erecting equal-magnification lens array plate 504.

The erecting equal-magnification lens array plate 504 of the image sensor 500 may be the erecting equal-magnification lens array plate 10 shown in FIG. 2 or the erecting equal-magnification lens array plate 90 shown in FIGS. 12 and 13. The erecting magnifying and reducing lens array plate 152 shown in FIG. 18 may be built in the housing 510 in place of the erecting equal-magnification lens array plate 504. It will be assumed here that the erecting equal-magnification lens array plate 10 shown in FIG. 2 is used.

The housing 510 is substantially cubic in shape and is integrally molded using a resin material. The housing 510 is formed with a line light source installation part 516 adapted to accommodate the line light source 502 and an erecting equal-magnification lens array plate installation part 512 adapted to accommodate the erecting equal-magnification lens array plate 504.

The erecting equal-magnification lens array plate installation part 512 is an elongated gutter formed on top of the housing 510 and extending in the main scanning direction. One of the inner wall surfaces of the erecting equal-magnification lens array plate installation part 512 represents an installation reference plane 514 provided to fit the erecting equal-magnification lens array plate 504 at a predetermined position in the housing 510. The erecting equal-magnification lens array plate 504 is built in the housing 510 such that the erecting equal-magnification lens array plate 504 is fitted to the erecting equal-magnification lens array plate installation part 512 and secured in its place while it is pressed against the installation reference plane 514. With this, the erecting equal-magnification lens array plate 504 is installed at a predetermined position in the housing 510.

A board installation part 518 adapted to accommodate the board 508 provided with the CCD line image sensor 506 is formed in the lower part of the housing 510. The board 508 is installed in the housing 510 such that an installation reference pin 520 provided in the housing 510 is engaged with a positioning hole 522 provided in the board 508. The shape of the installation reference pin 520 provided in the housing 510 may be as desired so long as it is convex. The hole 522 provided in the board 508 may be a through hole or a recess. Alternatively, a hole or a recess may be provided in the housing 510 and an installation reference pin may be provided in the board 508. In any case, at least one installation reference pin 520 is provided to secure the board 508 in the housing 510.

A plane perpendicular to the erecting equal-magnification lens array plate 504 and passing through the central line of the erecting equal-magnification lens array plate 504 in the sub-scanning direction will be defined as a reference plane 550. The installation reference plane 514 and the installation reference pin 520 are provided in the housing 510 such that the central line of the CCD line image sensor 506 resides on the reference plane 550 when the erecting equal-magnification lens array plate 504 and the board 508 are installed in the housing 510.

Thus, the erecting equal-magnification lens array plate 504 and the CCD line image sensor 506 of the image sensor unit 500 are installed in the housing 510 using non-alignment, without being subjected to fine adjustment of relative position. More specifically, the plate 504 and the sensor 506 are positioned using the installation reference plane 514 and the installation reference pin 520. Installation tolerance should be allowed when installing the erecting equal-magnification lens array plate 504 and the CCD line image sensor 506 in the housing 510 using non-alignment and so the erecting equal-magnification lens array plate 504 need be configured to address the tolerance. Since the image sensor unit 500 uses an erecting equal-magnification lens array plate provided with the light shielding member 16 as shown in FIG. 3 having the slit opening 20 substantially parallel with the main scanning direction, a width w0 of the slit opening 20 in the sub-scanning direction need be defined so as to allow installation tolerance in the sub-scanning direction.

Therefore, the width w0 of the slit opening 20 in the sub-scanning direction is defined in consideration of a width wt0 of the erecting equal-magnification image required on the image plane, allowing for the installation tolerance allowed when the erecting equal-magnification lens array plate 504 and the CCD line image sensor 506 of the image sensor unit 500 are installed in the housing 510 (hereinafter, wt0 will be referred to as allowed installation tolerance required image plane width).

Given that the installation tolerance of the erecting equal-magnification lens array plate 504 and the CCD line image sensor 506 in the sub-scanning direction is denoted by ±tv (an absolute value of tolerance will be 2×tv) and that the width of one column CCDs in the sub-scanning direction is denoted by wc, the allowed installation tolerance required image plane width wt0 defined when the CCD line image sensor 506 with one column of CCDs will be given by $$wt0 = 2 \times tv + wc \tag{24}$$

For example, wt0=120 μm, when tv=±40 μm and wc=40 μm. The allowed installation tolerance required image plane width wt0 defined when the CCD line image sensor 506 with three columns of CCDs will be given by $$wt0 = 2 \times tv + 3 \times wc \tag{25}$$

For example, wt0=200 μm, when tv=±40 μm and wc=40 μm.

The range required of the width w of the slit opening 20 in the sub-scanning direction defined for the allowed installation tolerance required image plane width wt0 can be derived in the same way as expression (9) above is derived. Thus, the range can be defined by expression (26) below, in which the required image plane width w0 in expression (9) is replaced by the allowed installation tolerance required image plane width wt0.

$$wt0 \times (F-1) \leq w \leq 2 \times F \times P \times \sin\theta - wt0 \times (F-1) \tag{26}$$

The larger the width w of the slit opening 20 in the sub-scanning direction, the larger the tolerance for shifts occurring at the time of installation. Therefore, the optimum value that meets the requirements for tolerance for shifts and for elimination of stray light will be given by $$w = F \times P \times \sin\theta \tag{27}$$

An exemplary range of the width w of the slit opening 20 in the sub-scanning direction will be discussed below. It will be assumed here that the plate thickness t of the lens array plate is such that t=2.4 mm, the refractive index n of the lens array plate is such that n=1.53, the lens's working distance WD=6.7 mm, the lens pitch P=0.42 mm, the lens arrangement angle θ=13.9°, the width wc of one column of CCDs in the sub-scanning direction is such that wc=0.04 mm, and the installation tolerance of the erecting equal-magnification lens array plate 504 and the CCD line image sensor 506 in the sub-scanning direction is ±0.04 mm.

The allowed installation tolerance required image plane width wt0 defined when the CCD line image sensor 506 with one column of CCDs will be such that wt0=0.120 mm based on expression (24). Since F=1+{t/(WD×n)}, F=1.234. Applying these values to expression (26), the range of the width w of the slit opening 20 in the sub-scanning direction defined when the CCD line image sensor 506 with one column of CCDs is used is given by $$0.028 \text{ mm} \leq w \leq 0.2219 \text{ mm} \tag{28}$$

The allowed installation tolerance required image plane width wt0 defined when the CCD line image sensor 506 with three columns of CCDs is used will be such that wt0=0.200 mm based on expression (25). F=1.234. Applying these values to expression (26), the range of the width w of the slit opening 20 in the sub-scanning direction defined when the CCD line image sensor 506 with three columns of CCDs is used is given by $$0.0468 \text{ mm} \leq w \leq 0.2032 \text{ mm} \tag{29}$$

Expression (27) gives the optimum value of w that meets the requirements for tolerance for shifts and for elimination of stray light such that $$w = 0.125 \text{ mm} \tag{29}$$

regardless of whether one column of CCDs or three columns of CCDs are used. Application of the optimum value of w to the inequality on the left side of expression (26) results in $$wt0 \times (F-1) \leq 0.125 \text{ mm} \tag{30}$$

Substituting F=1.234 into expression (30) and modifying the result, we obtain $$wt0 \leq 0.534 \text{ mm} \tag{31}$$

Expression (31) shows that the maximum value of the allowed installation tolerance required image plane width wt0 is 0.534 mm.

Described above is the image sensor unit 500. Since the erecting equal-magnification lens array plate described with reference to FIGS. 1-18 is used to form the image sensor unit 500, a quality image signal in which stray light is suitably eliminated is obtained, and the size and weight of the image sensor unit is reduced. Since the erecting equal-magnification lens array plate 504 and the CCD line image sensor 506 are installed using the installation reference plane 514 and the installation reference pin 520 of the housing 510, the position of the equal-magnification lens array plate 504 and the CCD line image sensor 506 need not be adjusted so precisely. As a result, the image sensor unit can be built with ease and the manufacturing cost is reduced.

The housing 510 of the image sensor unit 500 is an integrally molded, one-piece component. By forming the housing 510 as an integrally molded, one-piece component, the precision of the position of the installation reference plane 514 and the installation reference pin 520 is increased. This allows larger tolerance in installing the erecting equal-magnification lens array plate and light-receiving devices, with the result that the assembly of the image sensor unit is facilitated.

The image sensor unit 500 shown in FIG. 19 is built such that the erecting equal-magnification lens array plate 504 is pressed against the installation reference plane 514 of the housing 510 for positioning, and the CCD line image sensor 506 is positioned according to the installation reference pin 520 for positioning the board 508. Alternatively, the erecting equal-magnification lens array plate 504 and the CCD line image sensor 506 may be secured at their positions in the housing by pressing them against an installation reference plane provided in the housing. In this case, a single installation reference plane or two different installation reference planes may be used.

Described above is an explanation based on an exemplary embodiment. The embodiment is intended to be illustrative only and it will be obvious to those skilled in the art that various modifications to constituting elements and processes could be developed and that such modifications are also within the scope of the present invention.

For example, in the embodiment, the light shielding member is formed by sandwiching a film member between the first lens array plate and the second lens array plate. Alternatively, a light shielding member may be formed by printing the bottom of the first lens array plate or the top of the second lens array plate with a slit opening pattern using a light-shielding material such as black ink. In this case, the slit opening is formed at a position on the surface of the convex lens on the bottom of the first lens array plate where light contributing to formation of an inverted image passes, and/or a position on the surface of the convex lens on the top of the second lens array plate where light contributing to formation of an inverted image passes. Since this eliminates the step of adjusting the position of a light shielder, the fabrication cost is reduced.

In the erecting equal-magnification optical system shown in FIG. 1, a plane perpendicular to the erecting equal-magnification lens array plate and passing through the central line of the erecting equal-magnification lens array plate in the sub-scanning direction is defined as the reference plane. Alternatively, a plane perpendicular to the erecting equal-magnification lens array plate and parallel with the main scanning direction may be defined as a reference plane.

In the embodiment described, a stack of two lens array plates is built to form an erecting equal-magnification lens array plate. The number of plates stacked is not limited to two. For example, three lens array plates may be stacked and a light shielding member may be provided on the intermediate plane in the lens array plate in the middle.

In the embodiment described, lenses are arranged in a hexagonal arrangement. However, the lens arrangement pattern may not be limited to a hexagonal arrangement. The present invention is equally applicable when the lenses are arranged in a square arrangement.

What is claimed is:

1. An erecting equal-magnification lens array plate including a stack of a plurality of individual lens array plates built such that pairs of corresponding lenses form a coaxial lens system, where each individual lens array plate is formed with a plurality of lenses on one or both surfaces of the individual lens array plate, the erecting equal-magnification lens array plate receiving light from a substantially straight light source facing one side of the erecting equal-magnification lens array plate, and the erecting equal-magnification lens array plate forming an erect equal-magnification image of the substantially straight light source on an image plane facing the other side of the erecting equal-magnification lens array plate, wherein
a light shielder operative to shield light not contributing to imaging is formed in a neighborhood of a position in the intermediate plane in the erecting equal-magnification lens array plate where an inverted image of the substantially straight light source is formed,
a main lens arrangement direction differs from a main scanning direction of the erecting equal-magnification lens array plate,
the light shielder restricts a light transmitting region of each lens such that lens regions outside a slit opening, which is substantially parallel with the main scanning direction, are totally prevented from transmitting light, and
given that the individual lens array plate has a plate thickness t, the lens's working distance is denoted by WD, and the individual lens array plate has a refractive index n, and a distance between the center of the lens and a reference plane perpendicular to the erecting equal-magnification lens array plate and substantially parallel with the main scanning direction is denoted by y1, a distance Y between the reference plane and the center of the slit opening in the sub-scanning direction is given by $Y = y1 \times \{1 + t/(WD \times n)\}$.

2. The erecting equal-magnification lens array plate according to claim 1, wherein
a light shielding wall for further reducing stray light not contributing to imaging is formed at least on one surface of the erecting equal-magnification lens array plate.

3. An image sensor unit comprising: a line light source operative to illuminate an image to be read;
the erecting equal-magnification lens array plate according to claim 1 operative to condense light reflected by the image to be read;
a light-receiving device for receiving light transmitted by the erecting equal-magnification lens array plate; and
a housing in which the line light source, the erecting equal-magnification lens array plate, and the light-receiving device are installed, wherein
the erecting equal-magnification lens array plate and the light-receiving device are installed at predetermined positions in the housing by pressing them against an installation reference plane provided in the housing, and given that the individual lens array plate has a plate thickness t, the lens's working distance is denoted by WD, and the individual lens array plate has a refractive index n, the lens pitch is denoted by P, a lens arrangement angle is denoted by θ, and a width of the erect equal-magnification image in the sub-scanning direction required on the image plane is denoted by wt0, allowing for an installation tolerance in the sub-scanning direction allowed when installing the erecting equal-magnification lens array plate and the light-receiving device are installed in the housing, a width w of the slit opening in the sub-scanning direction is in the range given by $wt0 \times t/(WD \times n) \leq w \leq 2 \times \{l + t/(WD \times n)\} \times P \times \sin\theta - wt0 \times t/(WD \times n)$.

4. The image sensor unit according to claim 3, wherein the housing is an integrally molded one-piece component.

5. An image reading device comprising:
the image sensor unit according to claim 3; and an image processing unit operative to process an image signal detected by the image sensor unit.

6. An image sensor unit comprising: a line light source operative to illuminate an image to be read;
the erecting equal-magnification lens array plate according to claim 1 operative to condense light reflected by the image to be read;
a light-receiving device for receiving light transmitted by the erecting equal-magnification lens array plate; and
a housing in which the line light source, the erecting equal-magnification lens array plate, and the light-receiving device are installed, wherein
the erecting equal-magnification lens array plate is installed at a predetermined position in the housing by pressing the plate against an installation reference plane provided in the housing,
the light-receiving device is installed at a predetermined position in the housing by means of an installation reference pin provided in the housing, and given that the individual lens array plate has a plate thickness t, the lens's working distance is denoted by WD, and the individual lens array plate has a refractive index n, the lens pitch is denoted by P, a lens arrangement angle is denoted by θ, and a width of the erect equal-magnification image in the sub-scanning direction required on the image plane is denoted by wt0, allowing for an installation tolerance in the sub-scanning direction allowed when installing the erecting equal-magnification lens array plate and the light-receiving device are installed in the housing, a width w of the slit opening in the sub-scanning direction is in the range given by $wt0 \times t/(WD \times n) \leq w \leq 2 \times \{l + t/(WD \times n)\} \times P \times \sin\theta - wt0 \times t/(WD \times n)$.

7. An erecting equal-magnification lens array plate including a stack of a plurality of individual lens array plates built such that pairs of corresponding lenses form a coaxial lens system, where each individual lens array plate is formed with a plurality of lenses on one or both surfaces of the individual lens array plate, the erecting equal-magnification lens array plate receiving light from a substantially straight light source facing one side of the erecting equal-magnification lens array plate, and the erecting equal-magnification lens array plate forming an erect equal-magnification image of the substantially straight light source on an image plane facing the other side of the erecting equal-magnification lens array plate, wherein
- a light shielder operative to shield light not contributing to imaging is formed in a neighborhood of a position in the intermediate plane in the erecting equal-magnification lens array plate where an inverted image of the substantially straight light source is formed,
- a main lens arrangement direction differs from a main scanning direction of the erecting equal-magnification lens array plate,
- the light shielder restricts a light transmitting region of each lens such that lens regions outside a slit opening, which is substantially parallel with the main scanning direction, are totally prevented from transmitting light, and
- given that the individual lens array plate has a plate thickness t, the lens's working distance is denoted by WD, the individual lens array plate has a refractive index n, the lens pitch is denoted by P, and a lens arrangement angle is denoted by θ, a width w of the slit opening in the sub-scanning direction is in the range given by $$w < 2 \times \{1 + t/(WD \times n)\} \times P \times \sin\theta.$$

8. The erecting equal-magnification lens array plate according to claim 7, wherein
- given that a width of the erect equal-magnification image required on the image plane is denoted by w0, a width w of the slit opening in the sub-scanning direction is in the range given by $$w \leq 2 \times \{1 + t/(WD \times n)\} \times P \times \sin\theta - w0 \times t/(WD \times n).$$

9. The erecting equal-magnification lens array plate according to claim 7, wherein
- given that a width of the erect equal-magnification image required on the image plane is denoted by w0, a width w of the slit opening in the sub-scanning direction is in the range given by $$w0 \times t/(WD \times n) \leq w \leq 2 \times \{1 + t/(WD \times n)\} \times P \times \sin\theta - w0 \times t/(WD \times n).$$

10. An erecting equal-magnification lens array plate including a stack of a plurality of individual lens array plates built such that pairs of corresponding lenses form a coaxial lens system, where each individual lens array plate is formed with a plurality of lenses on one or both surfaces of the individual lens array plate, the erecting equal-magnification lens array plate receiving light from a substantially straight light source facing one side of the erecting equal-magnification lens array plate, and the erecting equal-magnification lens array plate forming an erect equal-magnification image of the substantially straight light source on an image plane facing the other side of the erecting equal-magnification lens array plate, wherein
- a light shielder operative to shield light not contributing to imaging is formed in a neighborhood of a position in the intermediate plane in the erecting equal-magnification lens array plate where an inverted image of the substantially straight light source is formed,
- a main lens arrangement direction differs from a main scanning direction of the erecting equal-magnification lens array plate,
- the light shielder restricts a light transmitting region of each lens such that lens regions outside a slit opening, which is substantially parallel with the main scanning direction, are totally prevented from transmitting light, and
- given that the individual lens array plate has a plate thickness t, the lens's working distance is denoted by WD, and the individual lens array plate has a refractive index n, a width of the slit opening in the sub-scanning direction is denoted by w, and the lens pitch is denoted by P, a lens arrangement angle θ is set to be larger than θ1 that fulfills a condition $w = 2 \times \{1 + t/(WD \times n)\} \times P \times \sin\theta 1$ and smaller than an angle θ2 obtained by subtracting θ1 from a first lens abutting angle determined by the arrangement pattern of the lenses.

11. The erecting equal-magnification lens array plate according to claim 10, wherein
- the lens arrangement angle θ is no smaller than the angle θ1 plus 1° and no larger than the angle θ2 minus 1°.

* * * * *